US012804422B2

(12) United States Patent
Wang et al.

(10) Patent No.: US 12,804,422 B2
(45) Date of Patent: Nov. 17, 2026

(54) HYBRID WIRELESS PROCESSING CHAINS THAT INCLUDE DEEP NEURAL NETWORKS AND STATIC ALGORITHM MODULES

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 291 days.

(21) Appl. No.: 18/687,226

(22) PCT Filed: Sep. 12, 2022

(86) PCT No.: PCT/US2022/076288
§ 371 (c)(1),
(2) Date: Feb. 27, 2024

(87) PCT Pub. No.: WO2023/044284
PCT Pub. Date: Mar. 23, 2023

(65) Prior Publication Data

US 2024/0365137 A1 Oct. 31, 2024

Related U.S. Application Data

(60) Provisional application No. 63/244,591, filed on Sep. 15, 2021.

(51) Int. Cl.
*H04W 24/02* (2009.01)
*H04L 41/16* (2022.01)

(52) U.S. Cl.
CPC ............. *H04W 24/02* (2013.01); *H04L 41/16* (2013.01)

(58) Field of Classification Search
CPC .... G06N 3/0442; G06N 3/045; G06N 3/0464; G06N 3/09; G06N 3/098; G06N 20/00;
(Continued)

(56) References Cited

U.S. PATENT DOCUMENTS 12,156,221 B2 * 11/2024 Namgoong ......... H04L 27/2618
2016/0360141 A1 * 12/2016 Koike-Akino ....... H04B 1/1027
2019/0319659 A1 * 10/2019 Calabro .................. G06N 3/08
(Continued)

FOREIGN PATENT DOCUMENTS

CN 109217987 A 1/2019
CN 111434049 A 7/2020
(Continued)

OTHER PUBLICATIONS

"3rd Generation Partnership Project; Technical Specification Group Services and System Aspects; Study on traffic characteristics and performance requirements for AI/ML model transfer in 5GS (Release 18)", 3GPP TR 22.874 V0.2.0, Nov. 2020.
(Continued)

*Primary Examiner* — Robert J Lopata
(74) *Attorney, Agent, or Firm* — Colby Nipper PLLC

(57) ABSTRACT

Techniques and apparatuses are described for hybrid wireless communications processing chains that include deep neural networks (DNNs) and static algorithm modules. In aspects, a first wireless communication device communicates with a second wireless device using a hybrid transmitter processing chain. The first wireless communication device selects a machine-learning configuration (ML configuration) that forms a modulation deep neural network (DNN) that generates a modulated signal using encoded bits as an input. The first wireless communication device forms, based on the modulation ML configuration, the modulation DNN as part of a hybrid transmitter processing chain that includes the modulation DNN and at least one static algorithm module. In response to forming the modulation DNN, the first wireless communication devices processes wireless communications associated with the second wireless communication device using the hybrid transmitter processing chain.

20 Claims, 11 Drawing Sheets

(58) Field of Classification Search
CPC ....... G06N 3/044; H04L 1/0041; H04L 41/16; H04L 5/0023; H04L 5/0053; H04L 1/0056; H04L 1/1812; H04L 27/0008; H04W 24/02; H04B 7/0413
USPC .......................................................... 370/329
See application file for complete search history.

(56) References Cited

U.S. PATENT DOCUMENTS

| | | | | |
|---|---|---|---|---|
| 2021/0049451 | A1* | 2/2021 | Wang | G06N 3/045 |
| 2021/0064996 | A1 | 3/2021 | Wang et al. | |
| 2021/0158151 | A1* | 5/2021 | Wang | G06N 3/02 |
| 2021/0182658 | A1* | 6/2021 | Wang | G06N 3/045 |
| 2021/0194548 | A1 | 6/2021 | Pezeshki et al. | |
| 2022/0416937 | A1* | 12/2022 | Andrews | G06N 3/04 |
| 2023/0325679 | A1* | 10/2023 | Wang | G06N 3/08 706/25 |
| 2023/0344725 | A1* | 10/2023 | Wang | H04L 41/16 |
| 2024/0187295 | A1* | 6/2024 | Madadi | H04L 27/2695 |
| 2024/0289627 | A1* | 8/2024 | Tan | H04L 1/0009 |

FOREIGN PATENT DOCUMENTS

| | | |
|---|---|---|
| CN | 112997435 A | 6/2021 |
| WO | 2020171803 | 8/2020 |
| WO | 2021045748 | 3/2021 |
| WO | 2021061574 A1 | 4/2021 |
| WO | 2021098159 A1 | 5/2021 |
| WO | 2023044284 | 3/2023 |

OTHER PUBLICATIONS

"International Preliminary Report on Patentability", Application No. PCT/US2022/076288, Nov. 29, 2023, 7 pages.
"International Search Report and Written Opinion", Application No. PCT/US2022/076288, Dec. 9, 2022, 14 pages.
"Written Opinion", Application No. PCT/US2022/076288, Jul. 25, 2023, 5 pages.
"Foreign Office Action", EP Application No. 22793324.9, Mar. 14, 2025, 6 pages.
"Foreign Office Action", JP Application No. 2024-516656, Apr. 1, 2025, 9 pages.
"Foreign Office Action", KR Application No. 10-2024-7008132, May 19, 2026, 13 pages.
"Foreign Office Action", CN Application No. 202280061880.6, Sep. 2, 2026, 26 pages.
Sun, et al., "Adaptive Federated Learning with Gradient Compression in Uplink NOMA", Cornell University Library, Mar. 3, 2020, 10 pages.

* cited by examiner

| Neural Network Table 312 | |
|---|---|
| Neural Network Formation Configuration | Input Characteristics |
| ... | ... |
| Parameter Configurations 310 | Input Characteristics 306 |
| ... | ... |
| ... | ... |

Index 314 → (Parameter Configurations 310 row)

HYBRID WIRELESS PROCESSING CHAINS THAT INCLUDE DEEP NEURAL NETWORKS AND STATIC ALGORITHM MODULES

RELATED APPLICATION(S)

This application is a national stage entry of International Application No. PCT/US2022/076288, filed Sep. 12, 2022, which claims the benefit of U.S. Provisional Application No. 63/244,591, filed Sep. 15, 2021, the disclosures of which are incorporated herein by reference in their entireties.

BACKGROUND

The evolution of wireless communication systems oftentimes stems from a demand for data throughput. As one example, the demand for data throughput increases as more and more devices gain access to the wireless communication system. As another example, evolving devices execute data-intensive applications that utilize more data throughput than traditional applications, such as data-intensive streaming video applications, data-intensive social media applications, data-intensive audio services, etc. This increased demand can, at times, exceed the available data throughput of the wireless communication system. Thus, to accommodate increased data usage, evolving wireless communication systems utilize increasingly complex architectures to provide more data throughput relative to legacy wireless communication systems.

To increase data capacity, fifth-generation (5G) standards and technologies transmit data using higher frequency ranges, such as the above-6 Gigahertz (GHz) band. However, transmitting and recovering information using these higher frequency ranges poses challenges. Higher frequency signals are more susceptible to multipath fading, scattering. atmospheric absorption, diffraction, interference, and so forth, relative to lower frequency radio signals. These signal distortions oftentimes lead to errors when recovering the information at a receiver. User mobility also impacts how well information may be transmitted and/or recovered using these higher frequency ranges since channel conditions change as a device moves locations. Hardware capable of transmitting, receiving, routing, and/or otherwise using these higher frequencies can be complex and expensive, which increases the processing costs in a wireless network device. With recent technological advancements, new approaches may be available to improve the performance (e.g., data throughput, reliability) of wireless communications.

SUMMARY

This document describes techniques and apparatuses for hybrid wireless communications processing chains that include deep neural networks (DNN) and static algorithm modules. In aspects, a first wireless communication device communicates with a second wireless device using a hybrid transmitter processing chain. The first wireless communication device selects a machine-learning configuration (ML configuration) that forms a modulation deep neural network (DNN) that generates a modulated signal using encoded bits as an input. The first wireless communication device forms, based on the modulation ML configuration, the modulation DNN as part of a hybrid transmitter processing chain that includes the modulation DNN and at least one static algorithm module. Using the hybrid transmitter processing chain, the first wireless communication devices transmits wireless communications signals to the second wireless communication device.

In aspects, a first wireless communication device communicates with a second wireless communication device using a hybrid receiver processing chain. The first wireless communication device selects a demodulation machine-learning (ML) configuration that forms a demodulation deep neural network (DNN) that generates encoded bits as output using a modulated signal as input. The first wireless communication device forms. using the demodulation ML configuration, the demodulation DNN as part of the hybrid receiver processing chain that includes at least one static algorithm module and the demodulation DNN. Using the hybrid receiver processing chain, the first wireless communication device processes wireless signals received from the second wireless communication device.

In aspects, a base station communicates with a user equipment (UE) using a hybrid wireless communications processing chain that includes at least one DNN and at least one static algorithm module. The base station selects a machine-learning configuration (ML configuration) that forms a base station-side DNN (e.g., a base station-side modulation DNN) that generates a modulated downlink signal using encoded bits as input or generates encoded bits using a modulated uplink signal as input. The base station indicates the ML configuration to the UE and forms, based on the indicated ML configuration, a base station-side DNN as part of a hybrid wireless communications processing chain that includes the base station-side DNN and at least one static algorithm. The base station processes wireless communications using the hybrid wireless communications processing chain.

In aspects, a UE communicates with a base station in a wireless network using a wireless communications processing chain that includes a DNN and at least one static algorithm module. The UE receives an indication of an ML configuration that forms a DNN that processes wireless communications associated with a base station. The UE then selects a UE-side ML configuration that forms a UE-side DNN that (i) generates encoded bits as output using a modulated downlink signal as input or (ii) generates a modulated uplink signal using the encoded bits as the input. The UE then forms, using the UE-side ML configuration, the UE-side DNN as part of a hybrid wireless communications processing chain that includes at least one static algorithm module and the UE-side DNN and processes wireless communications associated with the base station using the hybrid wireless communications processing chain.

The details of one or more implementations of hybrid wireless communications processing chains that include DNNs and static algorithm modules are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of hybrid wireless communications processing chains that include deep neural networks (DNNs) and static algorithm modules are described below. The use of the same reference numbers in different instances in the description and the figures indicate similar elements.

DETAILED DESCRIPTION

Figure 1:
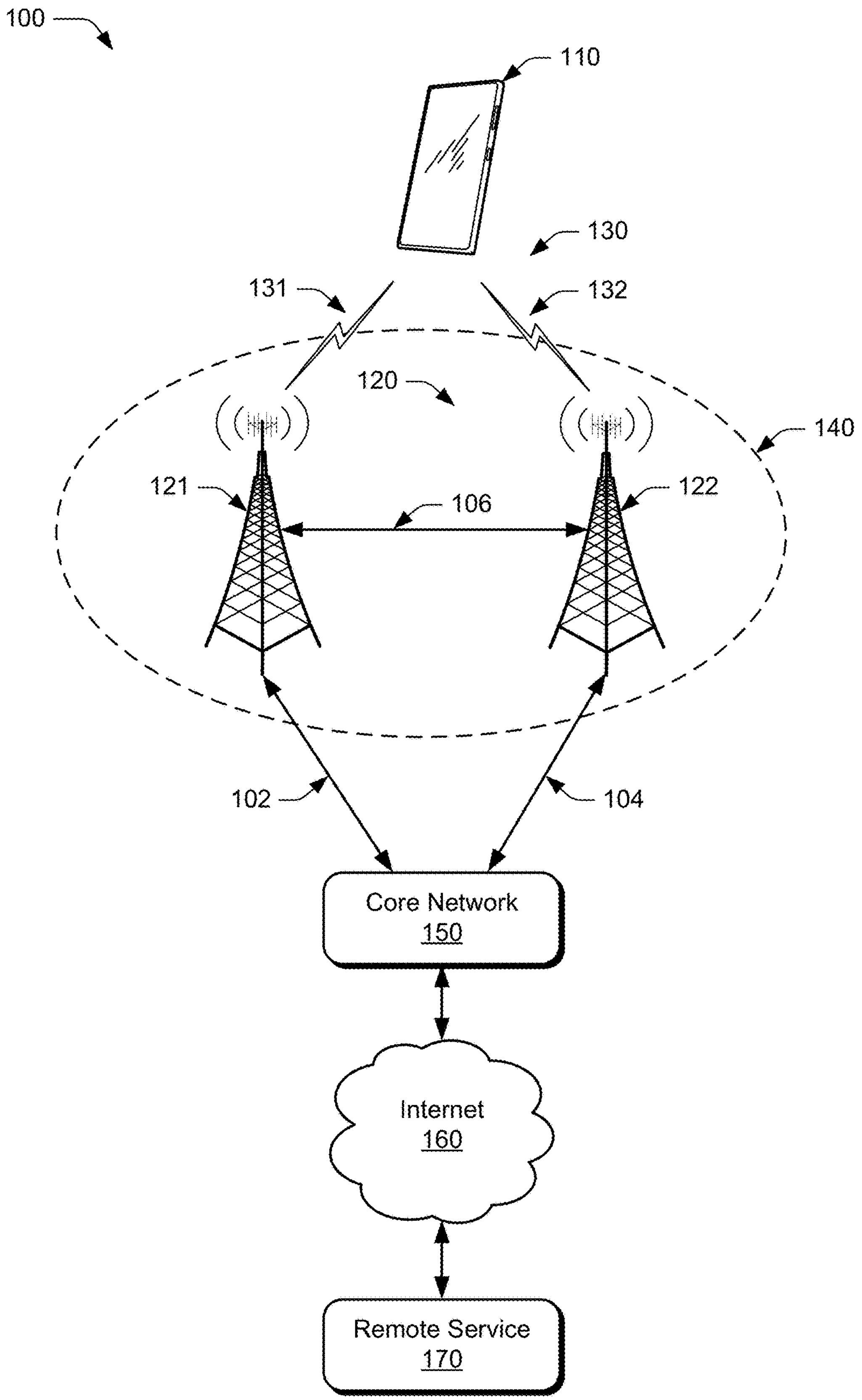
FIG. 1 illustrates an example environment in which various aspects of hybrid wireless communications processing chains that include DNNs and static algorithm modules can be implemented.

To accommodate increased data usage, evolving wireless communication systems (e.g., fifth-generation (5G) systems, sixth-generation (6G) systems) utilize higher frequency ranges and increasingly complex architectures to provide more data throughput relative to legacy wireless communication systems. To illustrate, the higher radio frequencies may add complexity to transmitter and receiver processing chains in order to successfully exchange data wirelessly using the higher frequency ranges. For instance, a channel estimation block in the receiver processing chain estimates or predicts how a transmission environment distorts a signal propagating through the transmission environment. Channel equalizer blocks reverse the distortions identified by the channel estimation block from the signal. These complex functions oftentimes become more complicated when processing higher frequency ranges, such as 5G frequencies at, around, and/or above the 6 GHz range. For example, transmission environments add more distortion to the higher frequency ranges relative to lower frequency ranges and make information recovery more complex. User mobility introduces dynamic changes to the transmission environment as a mobile device moves locations, which also contributes to the complexity of transmitting and recovering information using the higher frequency ranges. For instance, distortion introduced to a signal propagating towards a first location differs from distortion introduced to the signal propagating towards a second location. Hardware capable of processing and routing the higher frequency ranges adds increased costs and complex physical constraints to devices.

Deep neural networks (DNNs) provide solutions to complex processing, such as the complex functionality used in a wireless communication system. By training a DNN on wireless communications processing chain operations (e.g., transmitter and/or receiver processing chain operations), the DNN can replace the conventional complex functionality in a variety of ways, such as by replacing some or all of the conventional processing blocks used in end-to-end processing of wireless communication signals, replacing individual wireless communications processing chain blocks (e.g., a modulation block, a demodulation block), and so on. Dynamic reconfiguration of a DNN, such as by modifying various machine-learning configurations (e.g., coefficients, layer connections, kernel sizes), also provides an ability to adapt to changing operating conditions, such as changes due to user mobility, interference from neighboring cells, bursty traffic, and so forth.

The complexity of implementing and/or training a DNN increases relative to various factors, such as the intricacy and/or amount of functionality provided by the DNN, a number of input parameters to the DNN, a variation and/or range of the input parameters, an amount of variation and/or range of training data, and so forth. A first DNN, for instance, that provides most or all functionality included in a wireless communications signal processing chain may involve more complexity relative to a second DNN that provides a sub-portion of functionality included in the wireless communications signal processing chain. As an example, the first DNN may process larger quantities of training data, process larger quantities of input data, use more system computational power and/or memory, use longer durations for training and/or real-time computations, and so forth, relative to the second DNN.

Machine-learning algorithms (e.g., a DNN) dynamically modify a model or algorithm while conventional algorithms use predefined rules. As one example, conventional encoders and/or decoders use static and/or fixed algorithms to encode and/or decode bits. This can include static algorithms implemented using any combination of software, firmware, and/or hardware. To illustrate, a conventional encoder (and/or decoder) implements a static encoding algorithm (and/or static decoding algorithm) by explicitly programming predefined logic and/or rules used under all operating conditions. Similarly, static encoding algorithms generate the same output given the same input. The predefined logic and/or rules may use input parameters (e.g., encoding/decoding rates) that configure features and/or select particular program branches of the algorithm to change the output. However, the input parameters do not modify or change the predefined logic and/or rules. In contrast, machine-learning algorithms (e.g., a DNN) dynamically modify the behavior and/or resulting output of the algorithms using training and feedback. For example, a machine-learning algorithm identifies patterns in data through training and feedback and generates new logic that modifies the machine-learning algorithm to predict or identify these patterns in new (future) data.

In aspects of hybrid wireless communications processing chains that include DNNs and static algorithm modules, devices implement a hybrid wireless communications processing chain (e.g., a hybrid transmitter processing chain and/or a hybrid receiver processing chain) using a combination of DNNs and static algorithms to balance complexity with adaptability. The inclusion of trained DNNs in a wireless communications processing chain provides adaptability to changing input data and operating environments, such as the dynamic changes in wireless communications due to user mobility, interference, multiple-input, multiple-output (MIMO) configurations, etc. The inclusion of static algorithms in the wireless communications chain reduces an amount of complexity in the trained DNNs by reducing an amount of functionality provided by the DNNs. In other words, using a combination of static algorithms and DNNs in the wireless communications processing chain reduces implementation complexity and provides adaptability to changing channel environments. As an example. a base station and/or UE uses static bit encoding and/or decoding algorithms in wireless communications processing chains to reduce design and/or implementation complexity (e.g., by using conventional encoders/decoders) and use modulation and/or demodulation DNNs (e.g., DNNs trained to perform modulation, demodulation) to increase the adaptability of the processing chains to dynamic operating environments (e.g., changing channel conditions, changing network loads, changing UE locations, changing UE data requirements). Alternatively or additionally, the modulation and/or demodulation DNNs are trained to perform various MIMO operations, such as antenna selection, MIMO precoding, MIMO spatial multiplexing, MIMO diversity coding processing, MIMO spatial recovery, MIMO diversity recovery, and so forth. This combination helps simplify the complexity of DNNs while maintaining the adaptability provided through the use of DNNs.

Example Environment

FIG. 1 illustrates an example environment 100, which includes a user equipment 110 (UE 110) that can communicate with base stations 120 (illustrated as base stations 121 and 122) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination or future evolution thereof.

The base stations 120 communicate with the user equipment 110 using the wireless links 131 and 132, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and future evolutions. In various aspects, the base stations 120 and UE 110 may be implemented for operation in sub-gigahertz bands, sub-6 GHz bands (e.g., Frequency Range 1), and/or above-6 GHZ bands (e.g., Frequency Range 2, millimeter wave (mmWave) bands) that are defined by one or more of the 3GPP LTE, 5G NR, or 6G communication standards (e.g., 26 GHZ, 28 GHZ, 38 GHZ, 39 GHZ, 41 GHZ, 57-64 GHZ, 71 GHZ, 81 GHZ, 92 GHz bands, 100 GHz to 300 GHZ, 130 GHz to 175 GHZ, or 300 GHz to 3 THz bands). Multiple wireless links 130 may be aggregated in a carrier aggregation or multi-connectivity to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN, NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface, or using an X2 Application Protocol (X2AP) through an X2 interface, at 106, to exchange user-plane and control-plane data. The user equipment 110 may connect, via the core network 150, to public networks, such as the Internet 160, to interact with a remote service 170.

Example Devices

Figure 2:
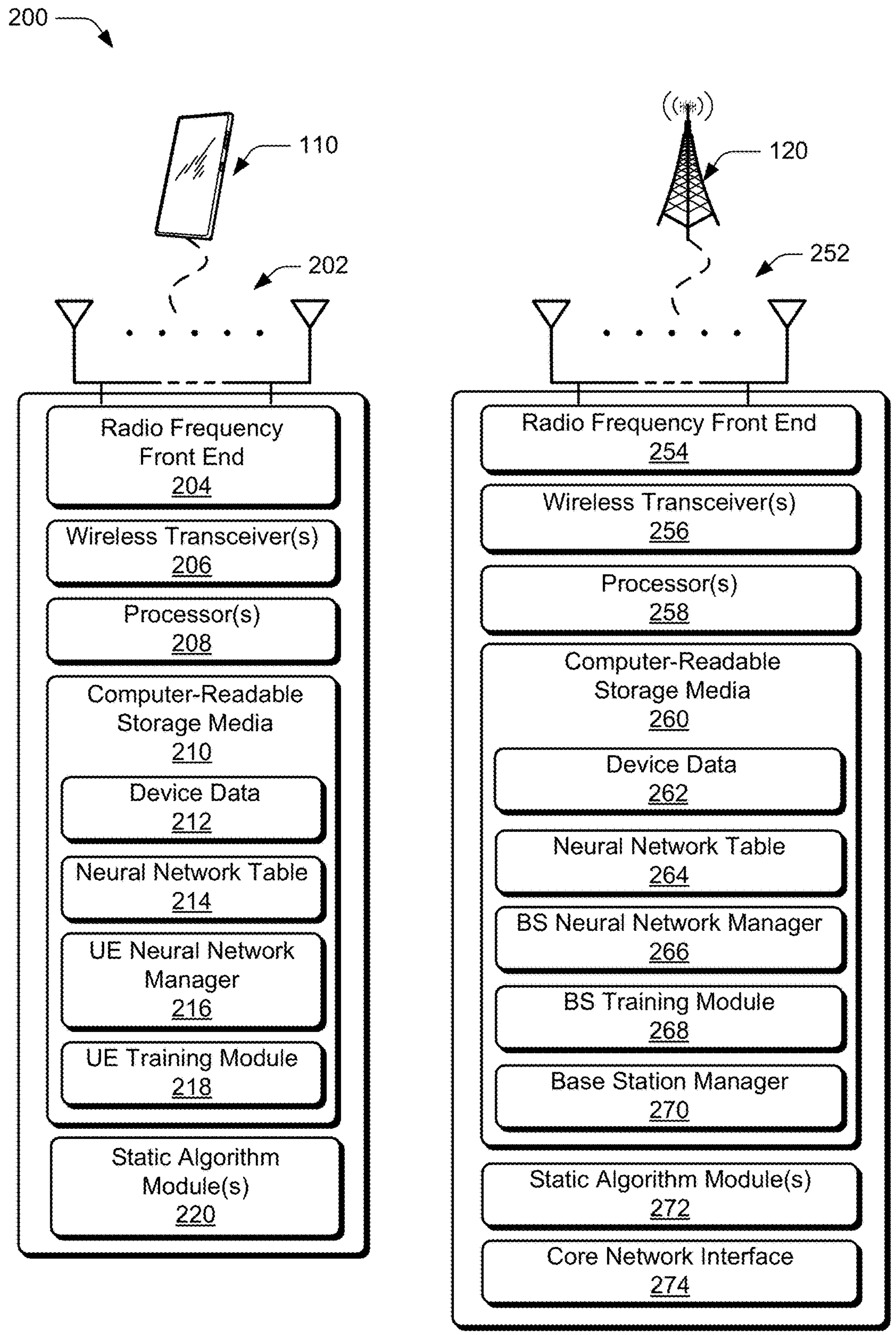
FIG. 2 illustrates an example device diagram of devices that can implement various aspects of hybrid wireless communications processing chains that include DNNs and static algorithm modules.

FIG. 2 illustrates an example device diagram 200 of the UE 110 and one of the base stations 120 that can implement various aspects of hybrid wireless communications processing chains that include DNNs and static algorithm modules. The UE 110 and the base station 120 may include additional functions and interfaces that are omitted from FIG. 2 for the sake of clarity.

The UE 110 includes antenna array 202, a radio frequency front end 204 (RF front end 204), and one or more wireless transceiver 206 (e.g., an LTE transceiver, a 5G NR transceiver, and/or a 6G transceiver) for communicating with the base station 120 in the RAN 140. The RF front end 204 of the UE 110 can couple or connect the wireless transceiver 206 to the antenna array 202 to facilitate various types of wireless communication. The antenna array 202 of the UE 110 may include an array of multiple antennas that are configured in a manner similar to or different from each other. The antenna array 202 and the RF front end 204 can be tuned to, and/or be tunable to, one or more frequency bands defined by the 3GPP LTE communication standards, 5G NR communication standards, 6G communication standards, and/or various satellite frequency bands, such as the L-band (1-2 Gigahertz (GHz)), the S-band (2-4 GHZ), the C-band (4-8 GHZ), the X-band (8-12 GHZ), the Ku-band (12-18 GHZ), K-band (18-27 GHZ), and/or the Ka-band (27-40 GHZ), and implemented by the wireless transceiver 206. In some aspects, the satellite frequency bands overlap with the 3GPP LTE-defined, 5G NR-defined, and/or 6G-defined frequency bands. Additionally, the antenna array 202, the RF front end 204, and/or the wireless transceiver 206 may be configured to support beamforming for the transmission and reception of communications with the base station 120. By way of example and not limitation, the antenna array 202 and the RF front end 204 can be implemented for operation in sub-gigahertz (GHz) bands, sub-6 GHZ bands, and/or above 6 GHZ bands that are defined by the 3GPP LTE, 5G NR, 6G, and/or satellite communications (e.g., satellite frequency bands).

The UE 110 also includes one or more processor(s) 208 and computer-readable storage media 210 (CRM 210). The processor(s) 208 may be single-core processor(s) or multiple-core processor(s) composed of a variety of materials, for example, silicon, polysilicon, high-K dielectric, copper, and so on. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 can include user data, sensor data, control data, automation data, multimedia data, beamforming codebooks, applications, and/or an operating system of the UE 110, some of which are executable by the processor(s) 208 to enable user-plane data, control-plane information, and user interaction with the UE 110.

In aspects, the CRM 210 includes a neural network table 214 that stores various architecture and/or parameter configurations that form a neural network, such as, by way of example and not of limitation, parameters that specify a fully connected neural network architecture, a convolutional neural network architecture, a recurrent neural network architecture, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly. the neural network table 214 includes any combination of neural network formation configuration elements (NN formation configuration elements), such as architecture and/or parameter configurations, that can be used to create a neural network formation configuration (NN formation configuration). Generally, a NN formation configuration includes a combination of one or more NN formation configuration elements that define and/or form a DNN. In some aspects, a single index value of the neural network table 214 maps to a single NN formation configuration element (e.g., a 1:1 correspondence). Alternatively, or additionally, a single index value of the neural network table 214 maps to a NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described. In aspects, a machine-learning configuration (ML configuration) corresponds to an NN formation configuration.

The CRM 210 may also include a user equipment neural network manager 216 (UE neural network manager 216). Alternatively, or additionally, the UE neural network manager 216 may be implemented in whole or part as hardware logic or circuitry integrated with or separate from other components of the user equipment 110. The UE neural network manager 216 accesses the neural network table 214, such as by way of an index value, and forms a DNN using the NN formation configuration elements specified by a NN formation configuration, such as a modulation DNN and/or a demodulation DNN. This includes updating the DNN with any combination of architectural changes and/or parameter changes to the DNN as further described, such as a small change to the DNN that involves updating parameters and/or a large change that reconfigures node and/or layer connections of the DNN. In implementations, the UE neural network manager forms multiple DNNs to process wireless communications, such as a first DNN that forms a user equipment-side demodulation deep neural network (UE-side demodulation DNN) that receives analog-to-digital converter (ADC) samples of a (modulated) downlink signal as input and processes the ADC samples to recover encoded bits and a second DNN that forms a UE-side modulation DNN that receives encoded bits as input and generates digital samples of a modulated, baseband uplink signal, or digital samples of a modulated, intermediate frequency (IF) signal, that carries the encoded bits. In some aspects, the UE neural network manager 216 forwards updated machine-learning parameters, such as those generated by a training module, to the base station 120 to contribute information for federated learning, as further described with reference to FIG. 8.

The CRM 210 includes a user equipment training module 218 (UE training module 218). Alternatively, or additionally, the UE training module 218 may be implemented in whole or part as hardware logic or circuitry integrated with or separate from other components of the user equipment 110. The UE training module 218 teaches and/or trains DNNs using known input data and/or using feedback. As one example, the UE training module 218 trains a UE-side demodulation DNN using a cyclic redundancy check (CRC) as further described with reference to FIGS. 4 and 6. To illustrate, assume a UE-side demodulation DNN receives ADC samples of a downlink signal as input and processes the ADC samples to recover encoded bits. The UE training module 218 may train the UE-side demodulation DNN by adjusting various ML parameters (e.g., weights, biases) based on the CRC passing or failing. However, the UE training module 218 may alternatively or additionally train a UE-side modulation DNN. The UE training module 218 may train DNN(s) offline (e.g., while the DNN is not actively engaged in processing wireless communications) and/or online (e.g., while the DNN is actively engaged in processing wireless communications).

The UE 110 also includes one or more static algorithm module(s) 220. The static algorithm modules 220 may be implemented using any combination of hardware, software, and/or firmware. Thus, the static algorithm modules 220 may be implemented using processor-executable instructions stored on the CRM 210 and executable by the processor 208 (not shown in FIG. 2). Generally, a static algorithm module performs various types of operations using pre-defined logic and/or rules that do not change. In aspects, the static algorithm modules 220 implement operations associated with a wireless communications processing chain, such as encoding algorithms and/or decoding algorithms.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Remote Radio Head (RRH), Radio Unit (RU), and/or Remote Radio Unit (RRU). The base station 120 includes antenna array 252, a radio frequency front end 254 (RF front end 254), one or more wireless transceivers 256 (e.g., one or more LTE transceivers, one or more 5G NR transceivers, and/or one or more 6G transceivers) for communicating with the UE 110. The RF front end 254 of the base station 120 can couple or connect the wireless transceivers 256 to the antenna array 252 to facilitate various types of wireless communication. The antenna array 252 of the base station 120 may include an array of multiple antennas that are configured in a manner similar to, or different from, each other. The antenna array 252 and the RF front end 254 can be tuned to, and/or be tunable to, one or more frequency bands defined by the 3GPP LTE, 5G NR, 6G communication standards, and/or various satellite frequency bands, and implemented by the wireless transceivers 256. Additionally, the antenna array 252, the RF front end 254, and the wireless transceivers 256 may be configured to support beamforming (e.g., Massive multiple-input, multiple-output (Massive-MIMO)) for the transmission and reception of communications with the UE 110.

The base station 120 also includes processor(s) 258 and computer-readable storage media 260 (CRM 260). The processor 258 may be a single-core processor or a multiple-core processor composed of a variety of materials, for example, silicon, polysilicon, high-K dielectric, copper, and so on. CRM 260 may include any suitable memory or storage device such as random-access memory (RAM), static RAM (SRAM), dynamic RAM (DRAM), non-volatile RAM (NVRAM), read-only memory (ROM), or Flash memory useable to store device data 262 of the base station 120. The device data 262 can include network scheduling data. radio resource management data, beamforming codebooks, applications, and/or an operating system of the base station 120, which are executable by processor(s) 258 to enable communication with the UE 110.

The CRM 260 includes a neural network table 264 that stores multiple different NN formation configuration elements and/or NN formation configurations (e.g., ML configurations), where the NN formation configurations elements and/or NN formation configurations define various architecture and/or parameters for a DNN as further described with reference to FIG. 5. In some implementations, the neural network table includes input characteristics for each NN formation configuration element and/or NN formation configuration, where the input characteristics describe properties about the training data used to generate the NN formation configuration element and/or NN formation configuration. For instance, the input characteristics include, by way of example and not of limitation, an estimated UE location, multiple-input, multiple-output (MIMO) antenna configurations, power information, signal-to-interference-plus-noise ratio (SINR) information, channel quality indicator (CQI) information, channel state information (CSI), Doppler feedback, frequency bands, BLock Error Rate (BLER), Quality of Service (QOS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 264 maps to a single NN formation configuration element (e.g., a 1:1 correspondence). Alternatively, or additionally, a single index value of the neural network table 264 maps to a NN formation configuration (e.g., a combination of NN formation configuration elements).

In implementations, the base station 120 synchronizes the neural network table 264 with the neural network table 214 such that the NN formation configuration elements and/or input characteristics stored in one neural network table are replicated in the second neural network table. Alternatively, or additionally, the base station 120 synchronizes the neural network table 264 with the neural network table 214 such that the NN formation configuration elements and/or input characteristics stored in one neural network table represent complementary functionality in the second neural network table. To illustrate, an index value that maps to NN formation configuration elements that form a base station-side modulation DNN (BS-side modulation DNN) in the neural network table 264 also maps to NN formation configuration elements that form a (complementary) user equipment-side demodulation DNN (UE-side demodulation DNN) in the neural network table 214.

CRM 260 also includes a base station neural network manager 266 (BS neural network manager 266). Alternatively, or additionally, the BS neural network manager 266 may be implemented in whole or part as hardware logic or circuitry integrated with or separate from other components of the base station 120. In at least some aspects, the BS neural network manager 266 selects the NN formation configurations utilized by the base station 120 and/or UE 110 to configure deep neural networks for processing wireless communications, such as by selecting a combination of NN formation configuration elements to form BS-side modulation DNNs for processing downlink communications. a base station-side demodulation deep neural network (BS-side demodulation DNN) for processing uplink communications. a user equipment-side demodulation deep neural network (UE-side demodulation DNN) for processing downlink communications, and/or user equipment-side modulation DNNs (UE-side modulation DNNs) for processing uplink communications. In some implementations, the BS neural network manager 266 receives feedback from the UE 110 (e.g., a UE-selected NN formation configuration and/or a UE-selected DNN configuration) and selects the NN formation configuration based on the feedback. Alternatively or additionally, the BS neural network manager 266 uses the feedback to train BS-side DNNs. In some aspects, the BS neural network manager 266 uses federated learning techniques to identify a common NN formation configuration and/or common ML configuration for multiple UEs as described with reference to FIG. 8.

The CRM 260 includes a base station training module 268 (BS training module 268). Alternatively, or additionally, the BS training module 268 may be implemented in whole or part as hardware logic or circuitry integrated with or separate from other components of the base station 120. In aspects, the BS training module 268 teaches and/or trains DNNs using known input data and/or using feedback. As one example, the BS training module 268 trains a BS-side modulation DNN using hybrid automatic repeat request (HARQ) information and/or feedback from the UE 110. To illustrate, assume a BS-side modulation DNN receives encoded bits of a downlink signal as input and generates digital signal samples corresponding to a modulated, baseband downlink signal. However, in other aspects, the BS-side modulation DNN generates a digital, modulated IF downlink signal. The BS training module 268 may train the BS-side modulation DNN by adjusting various ML parameters (e.g., weights, biases) based on the HARQ information feedback. However, the BS training module 268 may alternatively or additionally train a BS-side demodulation DNN for processing uplink signals. The BS training module 268 may train DNN(s) offline (e.g., while the DNN is not actively engaged in processing wireless communications) and/or online (e.g., while the DNN is actively engaged in processing wireless communications).

In aspects, the BS training module 268 extracts learned parameter configurations from the DNN as further described with reference to FIG. 3. The BS training module 268 may then use the extracted learned parameter configurations to create and/or update the neural network table 264. The extracted parameter configurations include any combination of information that defines the behavior of a neural network, such as node connections, coefficients, active layers, weights, biases, pooling, etc.

CRM 260 also includes a base station manager 270. Alternatively, or additionally, the base station manager 270 may be implemented in whole or part as hardware logic or circuitry integrated with or separate from other components of the base station 120. In at least some aspects, the base station manager 270 configures the wireless transceiver(s) 256 for communication with the UE 110.

The base station 120 also includes one or more static algorithm module(s) 272. The static algorithm modules 220 may be implemented using any combination of hardware, software, and/or firmware. Thus, the static algorithm modules 272 may be implemented using processor-executable instructions stored on the CRM 260 and executable by the processor 258 (not shown in FIG. 2). Generally, a static algorithm module performs various types of operations using predefined logic and/or rules that do not change. In aspects, the static algorithm modules 272 implement operations associated with a wireless communications processing chain, such as encoding algorithms and/or decoding algorithms.

The base station 120 also includes a core network interface 274 that the base station manager 270 configures to exchange user-plane data, control-plane information, and/or other data/information with core network functions and/or entities. As one example, the base station 120 uses the core network interface 274 to communicate with the core network 150 of FIG. 1.

Training and Configuring Deep Neural Networks

Generally, a DNN corresponds to groups of connected nodes that are organized into three or more layers, where the DNN dynamically modifies the behavior and/or resulting output of the DNN algorithms using training and feedback. For example, a DNN identifies patterns in data through training and feedback and generates new logic that modifies the machine-learning algorithm (implemented as the DNN) to predict or identify these patterns in new (future) data. The connected nodes between layers are configurable in a variety of ways, such as a partially connected configuration where a first subset of nodes in a first layer are connected with a second subset of nodes in a second layer, or a fully connected configuration where each node in a first layer is connected to each node in a second layer, etc. The nodes can use a variety of algorithms and/or analysis to generate output information based upon adaptive learning, such as single linear regression, multiple linear regression, logistic regression, step-wise regression, binary classification, multiclass classification, multi-variate adaptive regression splines, locally estimated scatterplot smoothing, and so forth. At times, the algorithm(s) include weights and/or coefficients that change based on adaptive learning. Thus, the weights and/or coefficients reflect information learned by the DNN.

A DNN can also employ a variety of architectures that determine what nodes within the corresponding neural network are connected, how data is advanced and/or retained in the neural network, what weights and coefficients are used to process the input data, how the data is processed, and so forth. These various factors collectively describe a NN formation configuration (also referred to as a machine-learning (ML) configuration). To illustrate, a recurrent neural network (RNN), such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration used to form a DNN can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s) (e.g., specifying pooling layers to reduce the dimensions of input data), kernel parameter(s) (e.g., a filter size and/or kernel type to use in processing input data), weights (e.g., biases used to classify input data), and/or layer parameter(s) (e.g., layer connections and/or layer types). While described in the context of pooling parameters, kernel parameters, weight parameters, and layer parameters, other parameter configurations can be used to form a DNN. Accordingly, an NN formation configuration (e.g., an ML configuration) can include any other type of parameter that can be applied to a DNN that influences how the DNN processes input data to generate output data.

Figure 3:
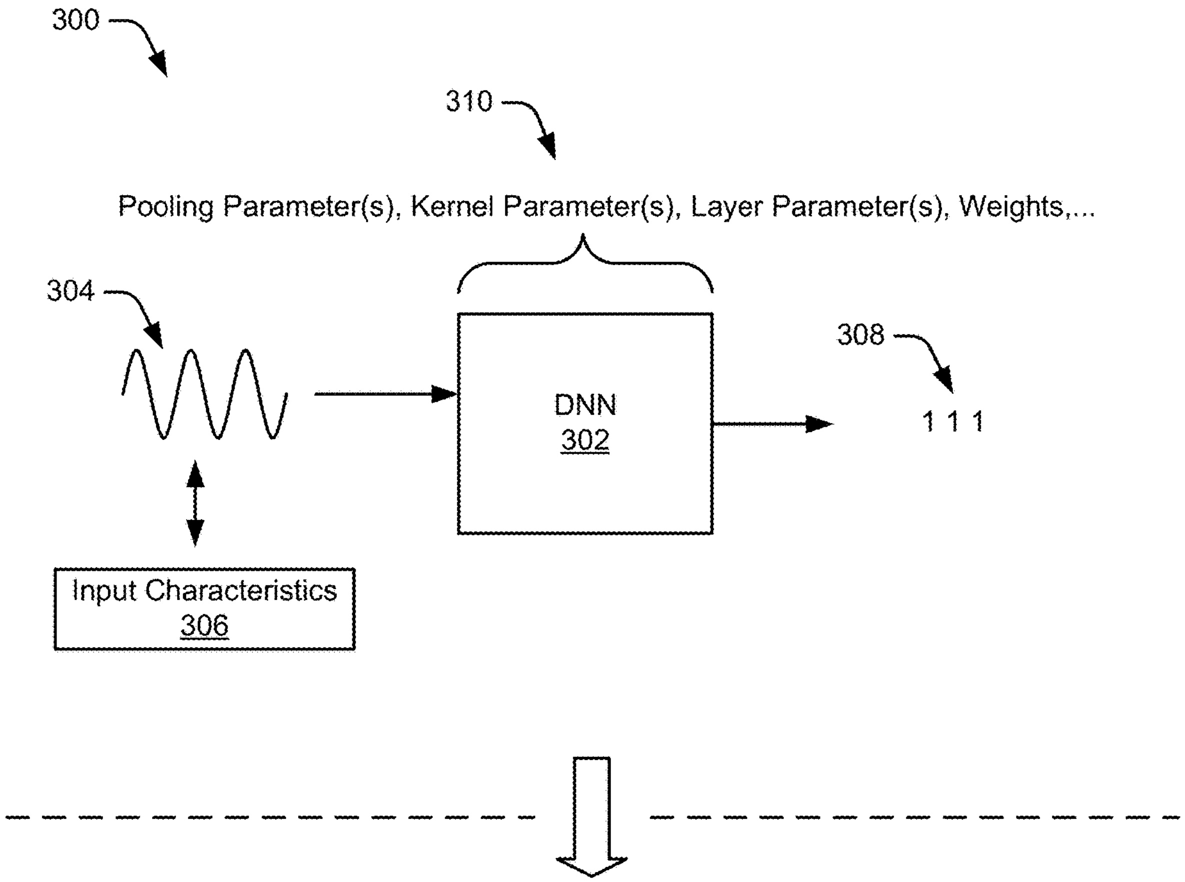
FIG. 3 illustrates an example of generating multiple neural network formation configurations in accordance with aspects of hybrid wireless communications processing chains that include DNNs and static algorithm modules.

FIG. 3 illustrates an example 300 that describes aspects of generating multiple NN formation configurations in accordance with hybrid wireless communications processing chains that include DNNs and static algorithm modules. At times, various aspects of the example 300 are implemented by any combination of the UE neural network manager 216, the UE training module 218, the BS neural network manager 266, and/or the BS training module 268 of FIG. 2.

The upper portion of FIG. 3 includes a DNN 302 that represents any suitable DNN used to implement hybrid wireless communications processing chains that include DNNs and static algorithm modules, such as a modulation DNN and/or a demodulation DNN. In aspects, a neural network manager generates different NN formation configurations and/or ML configurations for DNNs that perform portions of a wireless communications processing chain. Alternatively, or additionally, the neural network manager generates NN formation configurations and/or ML configurations based on different transmission environments, transmission channel conditions, and/or MIMO configurations. Training data 304 represents an example input to the DNN 302, such as data corresponding to a digital, modulated base band signal for any combination of: a downlink communication, an uplink communication, a MIMO and/or operating configuration, and/or a transmission environment. In other aspects, the training data 304 represents encoded bits as described with reference to FIGS. 4 and 5. In some implementations, the training module generates the training data mathematically or accesses a file that stores the training data. Other times, the training module obtains real-world communications data. Thus, the training module can train the DNN 302 using mathematically generated data, static data, and/or real-world data. Some implementations generate input characteristics 306 that describe various qualities of the training data, such as an operating configuration, transmission channel metrics, MIMO configurations, UE capabilities, UE location, modulation schemes, coding schemes, and so forth.

The DNN 302 analyzes the training data and generates an output 308 represented here as binary data. However, in other aspects, such as when the training data corresponds to encoded bits, the output 308 corresponds to a digital, modulated baseband or IF signal. Some implementations iteratively train the DNN 302 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. Some aspects of training include supplemental input (not shown in FIG. 3), such as soft decoding input for training demodulation DNNs.

In aspects, the training module extracts the architecture and/or parameter configurations 310 of the DNN 302 (e.g., pooling parameter(s), kernel parameter(s), layer parameter(s), weights), such as when the training module identifies that the accuracy meets or exceeds a desired threshold, the training process meets or exceeds an iteration number, and so forth. The extracted architecture and/or parameter configurations from the DNN 302 correspond to an NN formation configuration, NN formation configuration element(s), an ML configuration, and/or updates to an ML configuration. The architecture and/or parameter configurations can include any combination of fixed architecture and/or parameter configurations, and/or variable architectures and/or parameter configurations.

The lower portion of FIG. 3 includes a neural network table 312 that represents a collection of NN formation configuration elements, such as the neural network table 214 and/or the neural network table 264 of FIG. 2. The neural network table 312 stores various combinations of architecture configurations, parameter configurations, and input characteristics, but alternative implementations omit the input characteristics from the table. Various implementations update and/or maintain the NN formation configuration elements and/or the input characteristics as the DNN learns additional information. For example, at index 314, the neural network manager and/or the training module updates neural network table 312 to include architecture and/or parameter configurations 310 generated by the DNN 302 while analyzing the training data 304. At a later point in time, a neural network manager (e.g., the UE neural network manager 216, the BS neural network manager 266) selects one or more NN formation configurations from the neural network table 312 by matching the input characteristics to a current operating environment and/or configuration, such as by matching the input characteristics to current channel conditions and/or a MIMO configuration (e.g., antenna selection). In aspects, the base station 120 communicates the index 314 to the UE 110 (or vice versa) to indicate which NN formation configuration to use for forming (e.g., generating, instantiating or loading) DNNs as further described.

Hybrid Wireless Communications Processing Chains That Include DNNs and Static Algorithm Modules In aspects of hybrid wireless communications processing chains that include DNNs and static algorithm modules, devices implement a wireless communications processing chain (e.g., a transmitter processing chain and/or a receiver processing chain) using a combination of DNNs and static algorithms to balance complexity with adaptability. Each processing chain includes, for example, an encoding module and/or decoding module that uses static algorithms and at least one DNN that performs modulation and/or demodulation operations. The inclusion of the DNN provides flexibility for modifying how transmissions are generated in response to changes in an operating environment, such as modulation scheme changes, channel condition changes, MIMO configuration changes, and so forth. To illustrate, some aspects dynamically modify the DNN to generate a transmission with properties (e.g., frequency, modulation scheme, beam direction, MIMO antenna selection) that mitigate problems in the current transmission channel. The inclusion of the static algorithms, such as through a static encoding module and/or a static decoding module, simplifies the complexity of the DNN (e.g., reduces processing time, reduces training time) and balances complexity with efficiency.

Figure 4:
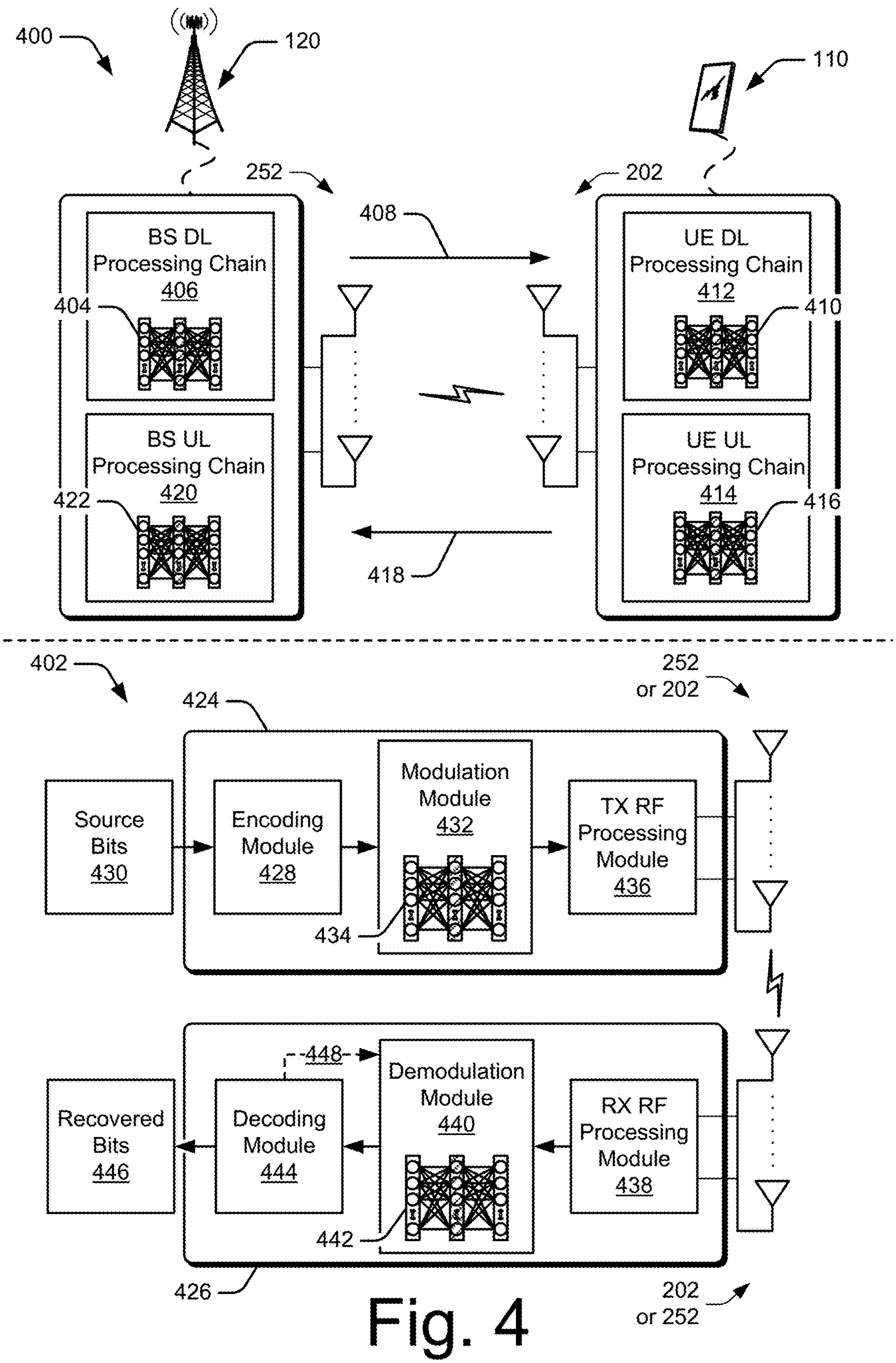
FIG. 4 illustrates example environments that compare downlink processing chains for wireless communications in accordance with various aspects of hybrid wireless communications processing chains that include DNNs and static algorithm modules.

FIG. 4 illustrates a first example environment 400 and a second example environment 402 that compare wireless communications processing chains, where the processing chains include one or more DNNs, sometimes in combination with static algorithms in accordance with various aspects of hybrid wireless communications processing chains that include DNNs and static algorithm modules. The environment 400 and the environment 402 each include example transmitter processing chains and example receiver processing chains, which may be used for processing downlink (DL) wireless communications (e.g., a DL transmitter processing chain at the base station 120, a DL receiver processing chain at the UE 110) or for processing uplink (UL) wireless communications (e.g., an UL transmitter processing chain at the UE 110, an UL receiver processing chain at the base station 120).

In the environment 400, the BS neural network manager 266 (not shown in FIG. 4) of the base station 120 manages one or more deep neural networks 404 (DNNs 404) included in a base station downlink processing chain 406 (BS downlink processing chain 406). In aspects, the BS neural network manager 266 configures the DNNs 404 to perform transmitter processing chain operations for downlink wireless communications directed to the UE 110. To illustrate, the BS neural network manager 266 selects one or more default ML configurations or one or more specific ML configurations (e.g., based on current downlink channel conditions as further described) and forms the DNNs 404 using the ML configurations. In aspects, the DNN(s) 404 perform some or all functionality of a (wireless communications) transmitter processing chain, such as receiving binary data as an input, encoding the binary data, generating a digital modulated baseband or IF signal using the encoded data, performing MIMO transmission operations (e.g., antenna selection, MIMO precoding, MIMO spatial multiplexing, MIMO diversity coding processing), and/or generating an upconverted signal (e.g., a digital representation) that feeds a digital-to-analog converter (DAC), which feeds the antenna array 252 for a downlink transmission 408. To illustrate, the DNNs 404 can perform any combination of convolutional encoding, serial-to-parallel conversion, cyclic prefix insertion, channel coding, time/frequency interleaving, orthogonal frequency division multiplexing (OFDM), MIMO transmission operations, and so forth.

The UE neural network manager 216 (not shown in FIG. 4) of the UE 110 manages one or more deep neural network(s) 410 (DNNs 410) included in a user equipment downlink processing chain 412 (UE downlink processing chain 412). In aspects, the UE neural network manager 216 configures the DNNs 410 to process downlink wireless communications signals received from the base station 120. To illustrate, the UE neural network manager 216 forms the DNNs 410 using an ML configuration indicated by the base station 120 and/or using an NN formation configuration selected by the UE neural network manager 216. In aspects, the DNNs 410 perform some or all functionality of a (wireless communications) receiver processing chain, such as processing that is complementary to that performed by the BS DL processing chain (e.g., a down-conversion stage, a demodulating stage, a decoding stage) regardless of whether the BS DL processing chain includes one or more DNNs, static algorithm modules, or both. To illustrate, the DNNs 410 can perform any combination of demodulating/extracting data embedded on the receive (RX) signal, recovering control information, recovering binary data, correcting for data errors based on forward error correction applied at the transmitter block, extracting payload data from frames and/or slots, and so forth.

Similarly, the UE 110 includes a first user equipment uplink processing chain 414 (UE uplink processing chain 414) that processes uplink communications using one or more deep neural networks 416 (DNN(s) 416) configured and/or formed by the UE neural network manager 216. To illustrate, and as previously described with reference to the DNNs 404, the DNNs 416 perform any combination of (uplink) transmitter chain processing operations for generating an uplink transmission 418 directed to the base station 120.

The base station 120 includes a first base station uplink processing chain 420 (BS uplink processing chain 420) that processes (received) uplink communications using one or more deep neural networks 422 (DNN(s) 422) managed by the BS neural network manager 266. The DNNs 422 perform complementary processing (e.g., receiver chain processing operations as described with reference to the DNNs 410) to that performed by the UE UL Processing chain regardless of whether the UE UL processing chain includes one or more DNNs, static algorithm modules, or both.

In contrast, the environment 402 illustrates example hybrid wireless communications processing chains that use a combination of static algorithm modules and DNNs to process uplink and/or downlink wireless communications. For instance, the environment 402 includes a hybrid transmitter processing chain 424 that uses a combination of static algorithm modules and DNNs. For example, the base station 120 uses the hybrid transmitter processing chain 424 instead of the BS DL DNN processing chain 406 or a conventional static algorithm BS-side DL processing chain, and/or the UE 110 uses the hybrid transmitter processing chain 424 instead of the UE UL DNN processing chain 412 or a conventional static algorithm UE-side uplink processing chain. The environment 402 also includes a hybrid receiver processing chain 426 that uses a combination of static algorithm modules and DNNs in a wireless communications receiver processing chain. To illustrate, the UE 110 uses the hybrid receiver processing chain 426 instead of the UE DL DNN processing chain 412 or a conventional static algorithm UE-side downlink processing chain, and/or the base station 120 uses the hybrid receiver processing chain 426 instead of the BS UL DNN processing chain 420 or a conventional static algorithm BS-side UL processing chain.

The hybrid transmitter processing chain 424 includes an encoding module 428 implemented using static algorithms that receives source bits 430 (e.g., from a protocol stack, not shown in FIG. 4) and generates encoded bits using one or more static encoding algorithms, such as a low-density parity-check (LPDC) encoding algorithm, a polar encoding algorithm, a turbo encoding algorithm, and/or a Viterbi encoding algorithm. The hybrid transmitter processing chain 424 utilizes any combination of hardware, software, and/or firmware to implement the encoding module 428. In aspects, the encoding module 428 receives input parameters (e.g., channel coding scheme parameters, rate-matching parameters) that instruct the encoding module how to encode the source bits 430. By using static algorithms within the encoding module 428, the hybrid transmitter processing chain 424 can use encoding modules optimized for better performance (e.g., optimized for processing speed, optimized for physical and/or memory size).

The hybrid transmitter processing chain 424 also includes a modulation module 432 that includes one or more modulation DNN(s) 434 that modulate the encoded bits received from the encoding module 428. To illustrate, the DNNs 434 correspond to a base station-side deep neural network (BS-side DNN) that modulates downlink communications. also referred to as a BS-side modulation DNN, and/or a user equipment-side deep neural network (UE-side DNN) that modulates uplink communications, also referred to as a UE-side modulation DNN. In some aspects, the BS neural network manager 266 of the base station 120 selects one or more modulation ML configurations to form the modulation DNNs 434. As one example, the BS neural network manager 266 selects a base station-side modulation ML configuration (BS-side modulation ML configuration) that processes downlink communications, such as that described with reference to FIG. 5. Alternatively or additionally, the BS neural network manager 266 selects a user equipment-side modulation ML configuration (UE-side modulation ML configuration) to send to the UE 110, such as that described with reference to FIG. 6. In some aspects, the BS neural network manager 266 selects updates to the modulation ML configuration, such as by using federated learning techniques as described with reference to FIG. 7.

The BS neural network manager 266 selects a modulation ML configuration (e.g., BS-side modulation ML configuration, UE-side modulation ML configuration) using any combination of factors. To illustrate, the BS neural network manager 266 selects the modulation configuration using factors such as, by way of example, current operating conditions, UE capabilities of the UE 110, a MIMO configuration (e.g., antenna selection), a modulation scheme, channel conditions, and so forth. To illustrate, and with respect to MIMO configurations, the BS neural network manager may select modulation ML configurations based on MIMO transmit and receive antenna configurations, such as a 2×2 MIMO configuration that corresponds to two transmit antennas, two receive antennas, a 4×4 MIMO configuration that corresponds to four transmit antennas, four receive antennas, and so forth. As another example, the BS neural network manager may select modulation ML configurations based on a modulation scheme.

In aspects, and as described with reference to FIG. 5, a base station (e.g., the base station 120) may indicate to the UE 110 a modulation ML configuration selected by the BS neural network manager, such as by indicating a BS-side modulation ML configuration through a field in downlink control information (DCI) transmitted in a physical downlink control channel (PDCCH) message. As one example, the DCI may include a first field that specifies a channel coding scheme and a second field that specifies the modulation ML configuration. Alternatively or additionally, the second field specifies a change and/or update to the modulation ML configuration, such as a change identified through federated learning techniques as described with reference to FIG. 7. However, in some aspects, the base station 120 implicitly indicates the channel coding scheme instead of using the first field in the DCI. As another example, the base station indicates the modulation ML configuration by transmitting a particular reference and/or pilot signal, such as a channel state information reference signal (CSI-RS), a demodulation reference signal (DMRS), and/or a phase tracking reference signal (PTRS) mapped to a particular modulation ML configuration. In some aspects, the base station 120 selects the modulation ML configuration from a fixed number and/or predefined set of modulation ML configurations, such as a subset of ML configurations stored in a neural network table and/or codebook, and transmits the codebook index to the UE.

Alternatively, using complementary operations, the base station 120 may select a user equipment-side demodulation machine-learning configuration (UE-side demodulation ML configuration) for processing downlink communications based on the BS-side modulation ML configuration and indicate that UE-side demodulation ML configuration in a DCI to the UE. As noted earlier, the indication may represent an index number to a neural network and/or codebook set of ML configurations. To illustrate, assume the base station 120 selects the UE-side modulation ML configuration using any combination of UE-specific capabilities, UE-specific signal-quality measurements, UE-specific link-quality measurements, UE-specific MIMO configurations, and so forth. When using a same transmission channel for downlink and uplink communications, such as through time division duplex (TDD) transmissions, the base station 120 may select a UE-side demodulation ML configuration to form (downlink) UE-side demodulation DNNs based on the (downlink) BS-side modulation ML configuration, such as that described with reference to FIG. 5. Alternatively or additionally, the base station 120 may implicitly or explicitly indicate a UE-side demodulation ML configuration for downlink processing when indicating the BS-side modulation ML configuration in the DCI.

The DNN(s) 434 perform modulation and/or MIMO operations within the hybrid transmitter processing chain 424. For instance, the modulation DNNs 434 receive the encoded bits from the encoding module 428 and generate digital modulated baseband signals (e.g., digital samples of modulated baseband signals). However, alternate implementations generate digital, modulated IF signals that are processed in similar manners as described with respect to the baseband signals. The digital modulated baseband signals may include MIMO communications that send several signals simultaneously through multiple antennas. For example, the modulation DNNs 434 may generate modulated baseband signals for 2×2 MIMO communications, 4×4 MIMO communications, and so forth. Thus, in aspects, the modulation DNNs 434 generate modulated baseband signals that split and/or replicate the encoded data onto multiple data streams. Alternatively or additionally, the modulation DNNs 434 perform other MIMO operations in generating the digital modulated baseband signals, such as MIMO precoding, MIMO spatial multiplexing, and/or MIMO diversity coding.

In generating the digital modulated baseband signals, the modulation DNNs 434 apply modulation schemes to the encoded data, such as an orthogonal frequency division multiplexing (OFDM) modulation format. The selected modulation ML configuration forms the modulation DNNs 434 to perform processing that applies OFDM modulation to the encoded data, such as Binary Phase Shift Keying (BPSK) using OFDM, Quadrature Phase Shift Keying (QPSK) using OFDM, 16 quadrature amplitude modulation (16-QAM) using OFDM, and so forth. In some aspects, such as when modulation DNNs 434 correspond to a BS-side modulation DNN for processing downlink transmissions, a base station (by way of the BS neural network manager 266) updates the modulation DNNs 434 based on current operating and/or channel conditions. To illustrate, and with reference to FIG. 5, the base station 120 trains the modulation DNNs 434 using feedback from the UE. As another example, such as when modulation DNNs 434 correspond to a UE-side modulation DNN for processing uplink transmissions, a UE trains the modulation DNNs 434 as described with reference to FIG. 6. This allows the base station 120 and/or the UE to improve the transmissions as the operating and/or channel conditions change.

Within the hybrid transmitter processing chain 424, the modulation DNNs, which may correspond to a downlink BS-side modulation DNN, or an uplink UE-side modulation DNN, generate a digital modulated baseband signal (or digital IF signal). The modulation module 432 feeds the digital modulated baseband signal into a transmit radio frequency processing module 436 (TX RF processing module 436) connected to antenna (e.g., the antenna array 252 when operating in the base station 120, the antenna array 202 when operating in the UE 110). The TX RF processing module 436 includes any combination of hardware, firmware, and/or software used to output a transmission via the antenna. For example, the TX RF processing module 436 includes a DAC that receives the digital modulated baseband signal from the modulation module 432 and generates an analog modulated baseband signal. The TX RF processing module 436 alternatively or additionally includes signal mixers that upconvert the analog modulated baseband signal to a desired carrier frequency, which is then transmitted out the antenna (e.g., the antenna array 252 as a downlink transmission, the antenna array 202 as an uplink transmission).

In the environment 402, the hybrid receiver processing chain 426 uses a combination of DNNs and static algorithm modules to perform complementary processing to a transmitter processing chain 406 (whether implemented using conventional static algorithms, DNNs, or a hybrid approach). For example, the base station 120 uses the hybrid receiver processing chain 426 instead of the BS UL processing chain 420 (e.g., a BS-side UL processing chain) and/or the UE 110 uses the hybrid receiver processing chain 426 in replace of the UE DL processing chain 412 (e.g., a UE-side downlink processing chain).

As one example, the UE 110 receives a downlink communication and/or transmission from the base station 120 using the antenna array 202, where the downlink communication may include MIMO communications. The antennas route the (analog) received downlink transmission to a receive radio frequency processing module 438 (RX RF processing module 438) included in the hybrid receiver processing chain 426. The RX RF processing module 438 converts the received analog signal into a digital, modulated baseband signal. However, in alternate implementations, the RX RF processing module 438 generates a digital modulated IF signal that is processed in similar manners as the digital, modulated baseband signal. For instance, the RX RF processing module 438 includes mixers that down-convert the downlink transmission to an analog baseband signal and an ADC that generates the digital modulated baseband signal by digitizing the down-converted analog signal. The RX RF processing module 438 then inputs the digital modulated baseband signal to a demodulation module 440 (e.g., UE-side demodulation module for processing downlink communications, a BS-side demodulation module for processing uplink communications) that includes one or more demodulation DNN(s) 442. To illustrate, the UE 110 forms the demodulation DNNs 442 using the UE neural network manager 216 or the base station 120 forms the demodulation DNNs 442 using the BS neural network manager 266. In aspects, the demodulation DNNs 442 perform complementary processing to the modulation DNNs 434 included in the modulation module 432, such as receiving a digital modulated baseband signal and processing the digital, modulated baseband signal to recover encoded data. This may include MIMO operations, such as MIMO spatial recovery and/or MIMO diversity recovery, channel estimation, channel equalizer functions, and so forth.

The demodulation module 440 inputs the recovered encoded data into a decoding module 444 that uses static algorithms to generate recovered bits 446. This may include the decoding module 444 receiving input parameters (e.g., channel coding scheme parameters, rate-matching parameters) that direct the decoding module on how to decode and generate the recovered bits 446. In some aspects, the decoding module 444 generates soft-decoding information 448, such as log-likelihood ratio information, and inputs the soft-decoding information into the demodulation DNNs 440. Similar to the encoding module 428, the decoding module 444 may implement any combination of static decoding algorithms (e.g., an LPDC decoding algorithm, a polar decoding algorithm, a turbo decoding algorithm, and/or a Viterbi decoding algorithm). In some aspects, the hybrid receiver processing chain 426 uses feedback from the decoding module 444, such as CRC information, to trigger training the demodulation DNNs 442 and/or use the feedback to train the demodulation DNNs 442, such as that described with reference to FIG. 5.

A hybrid wireless communications processing chain (e.g., the hybrid transmitter processing chain 424, the hybrid receiver processing chain 426) provides a device with an ability to balance complexity and adaptability in implementing and operating the processing chain. Including static algorithms in a wireless communications processing chain reduces an amount of functionality provided by a corresponding DNN, which reduces system computation power and/or memory consumption by the DNN and reduces processing and/or training durations of the DNN. The inclusion of a DNN within a wireless communications processing chain (connected to static algorithm modules) provides adaptability to the changing operating and/or channel conditions to mitigate channel and/or operating problems.

Signaling and Data Transaction Diagrams

Figure 5:
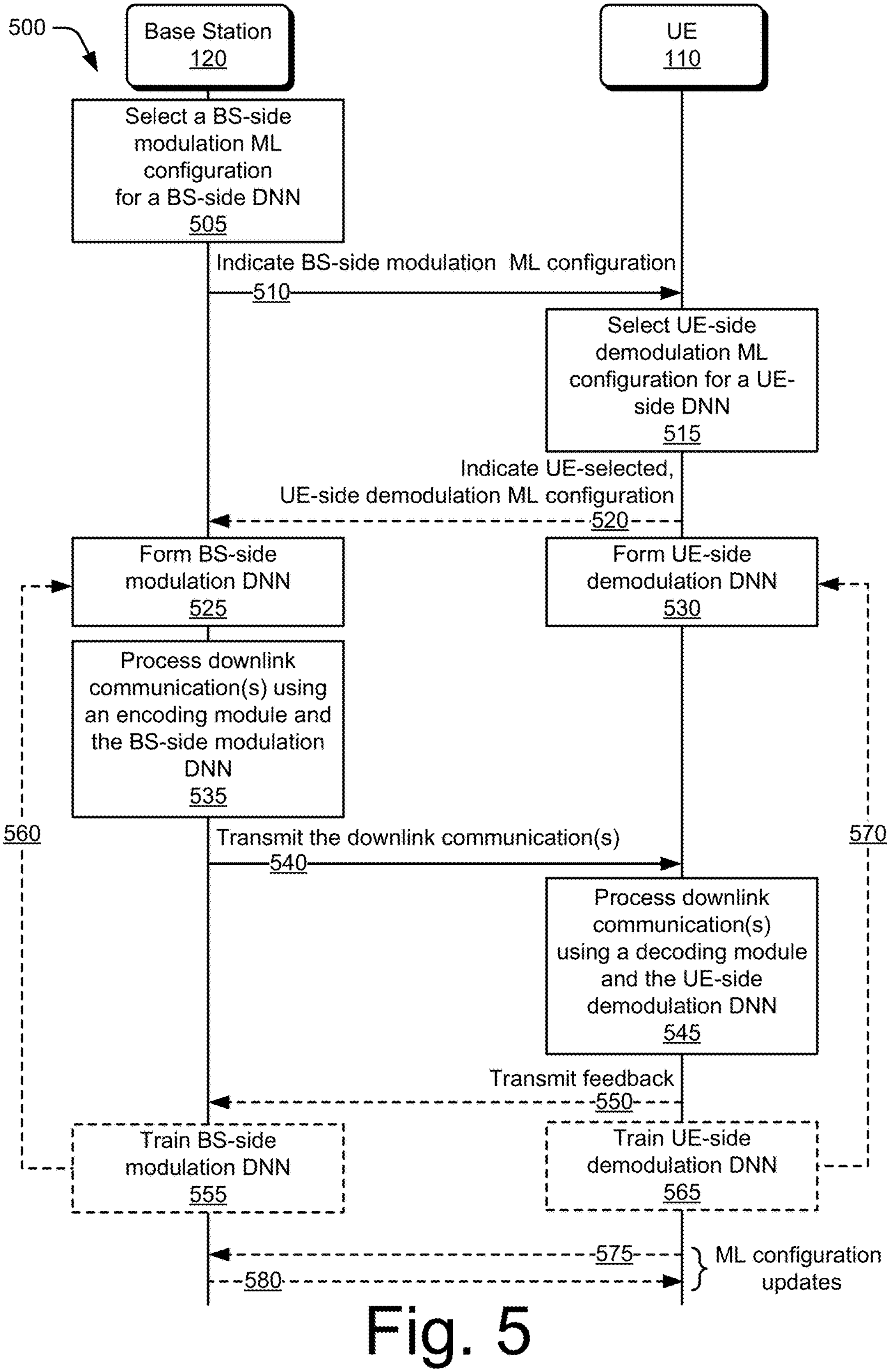
FIG. 5 illustrates an example transaction diagram between various network entities that implement hybrid wireless communications processing chains that include DNNs and static algorithm modules.
Figure 6:
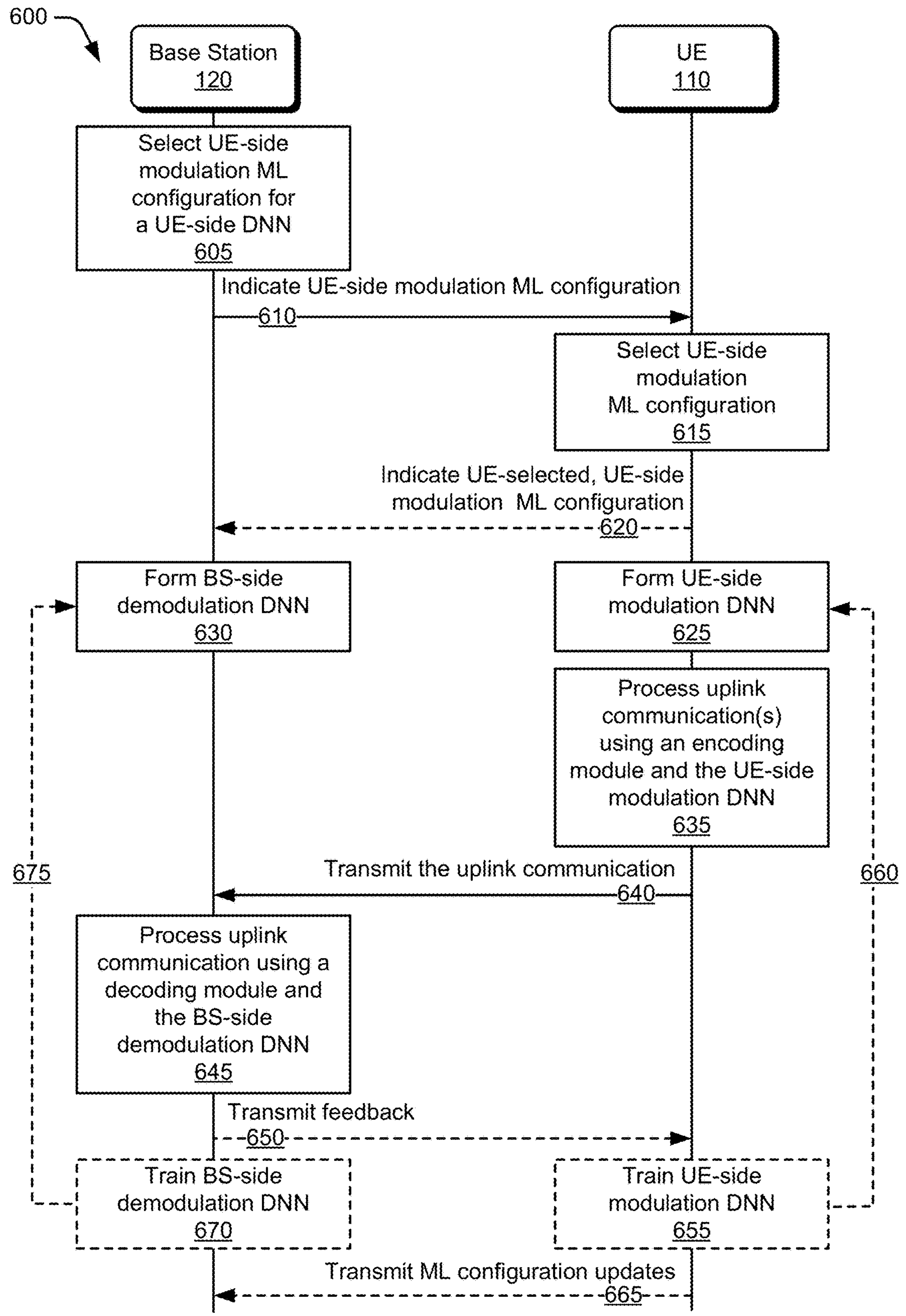
FIG. 6 illustrates an example transaction diagram between various network entities that implement hybrid wireless communications processing chains that include DNNs and static algorithm modules.
Figure 7:
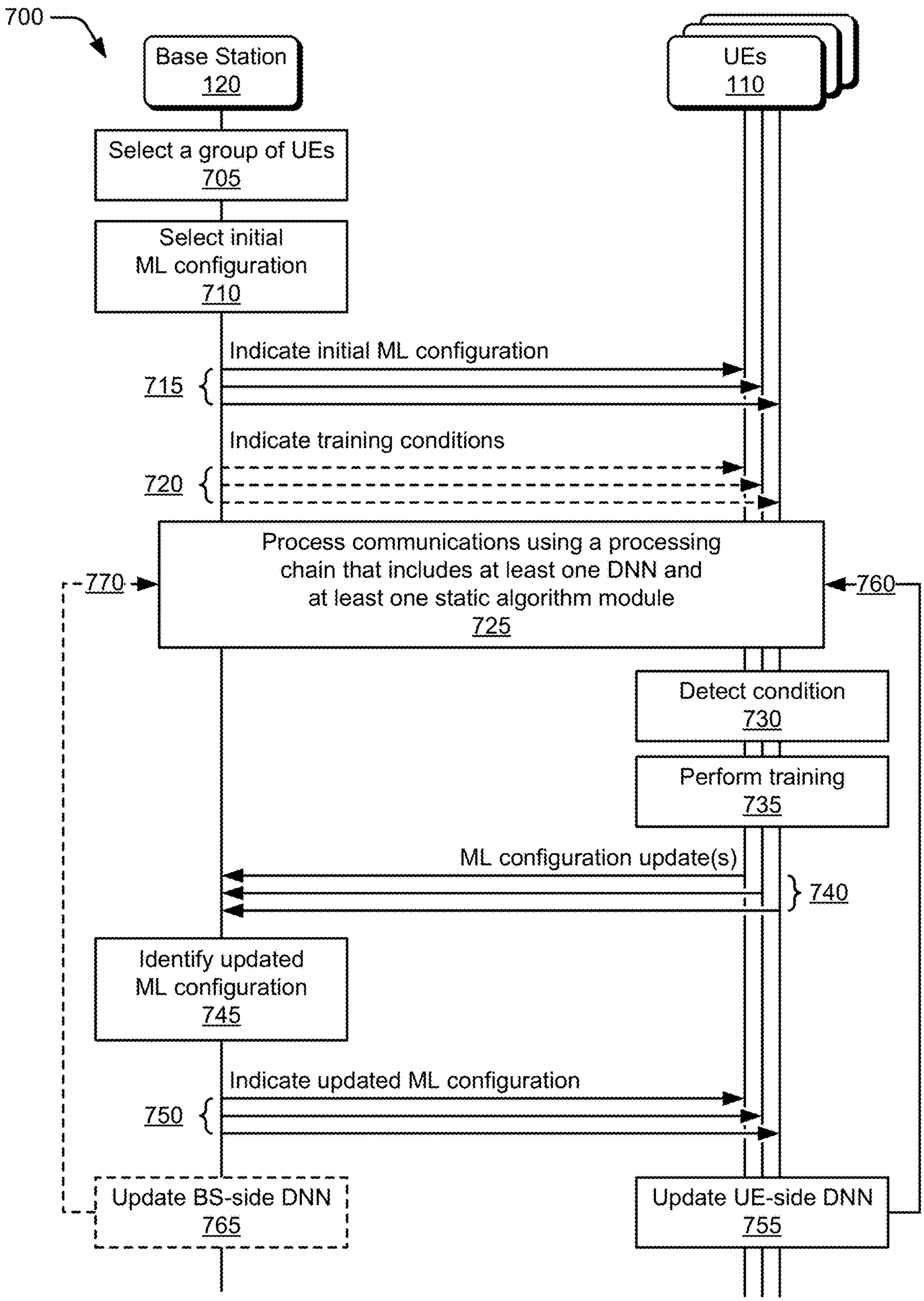
FIG. 7 illustrates an example transaction diagram between various network entities that implement hybrid wireless communications processing chains that include DNNs and static algorithm modules.

FIGS. 5-7 illustrate example signaling and data transaction diagrams between a base station and a user equipment in accordance with one or more aspects of hybrid wireless communications processing chains that include DNNs and static algorithm modules. Operations of the signaling and data transactions may be performed by the base station 120 and/or the UE 110 of FIG. 1, using aspects as described with reference to any of FIGS. 1-4. Although hybrid transmitter and receiver processing chains are presumed for both the BS and UE, in some situations a transmitter can use a hybrid processing chain while a receiver uses a conventional, DNN, or hybrid processing chain. Similarly, a receiver can use a hybrid processing chain when a transmitter uses a conventional, DNN, or hybrid processing chain.

A first example of signaling and data transactions for hybrid wireless communications processing chains that include DNNs and static algorithm modules is illustrated by the signaling and data transaction diagram 500 of FIG. 5. In the diagram 500, a base station (e.g., the base station 120) and a UE (e.g., the UE 110) exchange downlink wireless communications using processing chains that include a combination of static algorithm modules and DNNs in accordance with one or more aspects of hybrid wireless communications processing chains that include DNNs and static algorithm modules.

As illustrated, at 505, the base station 120 selects a base station-side modulation machine-learning configuration (BS-side modulation ML configuration) that forms a base station-side DNN (BS-side DNN) included in a BS-side transmitter processing chain that uses a combination of at least one DNN and at least one static algorithm module. To illustrate, the base station 120 selects a modulation ML configuration for a BS-side modulation DNN (e.g., the DNN 434) in a downlink transmitter processing chain (e.g., the hybrid transmitter processing chain 424). The base station 120 selects the BS-side modulation ML configuration using any combination of information. As one example, the base station 120 selects a default BS-side modulation ML configuration that forms a DL modulation DNN for generating broadcast transmissions. In other words, the base station 120 selects a modulation ML configuration that forms a modulation DNN that generates modulated transmissions with characteristics directed to general and/or unknown channel conditions, such as transmissions with DL modulation schemes that are more robust over a range of different channel conditions relative to other modulation schemes. Alternatively or additionally, the base station 120 selects the BS-side modulation ML configuration from a fixed number and/or predefined set of ML configurations (e.g., a set of ML configurations known to both the base station 120 and the UE 110). In some aspects, the base station 120 selects the BS-side modulation ML configuration based on information specific to the UE 110, such as UE location information, signal-quality measurements, link-quality measurements, UE capabilities, and so forth.

At 510, assuming that the UE has indicated a UE capability that includes demodulation DNN formation, the base station 120 indicates the selected BS-side modulation ML configuration to the UE 110. The base station 120, for instance, indicates the BS-side modulation ML configuration using a first field in DCI for PDCCH and (implicitly or explicitly) directs the UE 110 to select a reciprocal UE-side demodulation ML as further described at 515. By indicating the selected BS-side ML configuration, the base station 120 provides different UEs (e.g., different manufacturers, different UE capabilities) with information about how a corresponding BS-side DNN operates, thus allowing each UE to select a respective, complementary UE-side ML configuration, such as that described at 515. Alternatively, the base station 120 indicates a UE-side demodulation ML configuration to the UE 110 and (implicitly or explicitly) directs the UE 110 to form a demodulation DNN (using the UE-side demodulation ML configuration) for processing downlink communications.

In aspects, the base station 120 indicates, in addition to a ML configuration (e.g., a BS-side modulation configuration, a UE-side demodulation configuration), a channel coding scheme using a second field in the DCI (e.g., a new DCI format). As one example of indicating an ML configuration (e.g., a BS-side modulation ML configuration, a UE-side demodulation ML configuration), assume the base station 120 and the UE 110 use common and/or synchronized mappings for a predefined set of ML configurations. In aspects, the base station 120 indicates a particular ML configuration out of the predefined set of ML configurations to the UE 110, such as by indicating an index value that maps to the particular ML configuration. Based on the common and/or synchronized mappings, the UE 110 identifies the indicated ML configuration out of the predefined set of ML configurations using the index value. In some aspects, the base station 120 indicates the BS-side modulation ML configuration by transmitting a specific pilot and/or reference signal. For example, the base station 120 transmits a particular CSI-RS, DMRS, and/or PTRS that maps to a particular BS-side modulation ML configuration and/or index value.

At 515, the UE 110 selects a UE-side, demodulation ML configuration for a UE-side DNN included in a UE-side receiver processing chain, where the UE-side receiver processing chain uses a combination of at least one DNN and at least one static algorithm module. To illustrate, the UE 110 identifies the indicated BS-side modulation ML configuration communicated by the base station at 510 by analyzing the PDCCH DCI and/or by identifying a received reference and/or pilot signal. Based on identifying the indicated BS-side modulation ML configuration, the UE selects a complementary ML configuration that forms a demodulation DNN (e.g., the demodulation DNNs 442) in a hybrid receiver processing chain (e.g., the hybrid receiver processing chain 426). In some aspects, such as when the indication corresponds to an index value, the UE 110 uses the index value to obtain the UE-side demodulation ML configuration from a codebook and/or a predefined set of ML configurations.

Alternatively or additionally, the UE 110 selects the UE-side demodulation ML configuration by analyzing performance metrics (e.g., bit error rate (BER), block error rate (BLER)) of multiple demodulation ML configurations. As one example, the UE 110 forms an initial UE-side demodulation DNN using an initial ML configuration complementary to the indicated BS-side modulation ML configuration. The UE 110 obtains performance metrics of the UE-side demodulation DNN and determines that the performance metrics indicate degraded performance (e.g., the performance metrics associated with the initial ML configuration fail to meet a performance threshold). In response, the UE 110 selects a second UE-side demodulation ML configuration based on performance metrics. In other words, the UE 110 selects a second UE-side demodulation ML configuration that forms a second UE-side demodulation DNN with better performance metrics than the initial UE-side demodulation DNN (e.g., performance metrics that meet the performance threshold). To illustrate, the UE 110 analyzes a set of demodulation ML configurations and selects, from the set, the demodulation ML configuration associated with the best performance metrics. In some aspects, as part of analyzing and selecting the UE-side demodulation ML configuration, the UE 110 selects a channel demodulation scheme matching from that indicated by the base station (e.g., at 510). Alternatively or additionally, the UE 110 selects the UE-side demodulation ML configuration that forms a demodulation DNN that demodulates a particular modulation configuration (e.g., BPSK using OFDM, QPSK using OFDM, 16-QAM) using OFDM, and so forth. Thus, the UE 110 may also select the UE-side demodulation ML configuration based on any combination of other factors, such as a transport block size, a frequency grant size, a spatial grant size, a time grant size, and so forth. In some aspects, the UE 110 selects the UE-side demodulation ML configuration based on UE capabilities.

Accordingly, at 520, the UE optionally (as denoted by a dashed line) indicates a UE-selected, UE-side demodulation ML configuration to the base station 120. The UE 110 may indicate the UE-selected, UE-side demodulation ML configuration using any suitable mechanism, such as by transmitting a particular sounding reference signal (SRS) mapped to the selected demodulation ML configuration and/or by including an indication of the selected demodulation ML configuration in a channel state information (CSI) communication.

At 525, the base station 120 forms a BS-side modulation DNN. This can include the base station 120 using the BS-side modulation ML configuration selected at 505, or optionally selecting a second BS-side modulation ML configuration (and/or updating the BS-side modulation DNN) based on receiving an indication of a UE-selected, UE-side demodulation ML configuration. Similarly, at 530, the UE 110 forms a UE-side demodulation DNN, which can include the UE 110 using a UE-side demodulation ML configuration based on the indication from the base station 120 at 510 or using a UE-selected, UE-side demodulation ML configuration determined by the UE 110 at 515.

At 535, the base station 120 processes one or more downlink communications using an encoding module and the BS-side modulation DNN formed at 525. In aspects, the BS-side modulation DNN receives, as input, encoded bits from an encoding module implemented using static algorithms (e.g., the encoding module 428) and outputs a digital, modulated, baseband signal. This can additionally include the BS-side modulation DNN performing MIMO operations as further described with reference to FIG. 4. At 540, the base station 120 transmits the downlink communication to the UE 110, such as by converting the digital, modulated, baseband signal into an analog RF signal using a TX RF processing module (e.g., the TX RF processing module 436) coupled to antennas.

At 545, the UE 110 processes the downlink communication(s) using a decoding module and the UE-side demodulation DNN formed at 530. To illustrate, the UE 110 uses an RX RF processing module (e.g., the RX RF processing module 438) to down-convert the downlink communication transmitted at 540) and generate a digital, modulated baseband signal as described with reference to FIG. 4. The UE-side demodulation DNN receives the digital, modulated baseband signal as input and recovers encoded bits. In aspects, the UE 110 uses a decoding module implemented with static algorithms (e.g., the decoding module 444) to generate recovered bits. In some aspects, the UE-side demodulation DNN receives soft decoding information (e.g., the soft-decoding information 448) from the decoding module as input.

At 550, the UE 110 optionally (denoted with dashed lines) transmits feedback to the base station 120. For instance, the UE 110 transmits HARQ information to the base station 120 at 550, which may or may not trigger the base station 120 to train the BS-side modulation DNN to adjust weights, biases, and so forth.

Accordingly, at 555, the base station 120 optionally (denoted with dashed lines) trains the BS-side modulation DNN. To illustrate, the base station 120 determines to perform the training if the HARQ information indicates failures at the UE 110. Alternatively or additionally, the base station 120 uses signal-quality measurements and/or link-quality measurements returned by the UE 110 at 550 to trigger training the BS-side modulation DNN, such as by comparing the signal-quality and/or link-quality measurements to threshold values that indicate acceptable performance levels and triggering the training when the signal-quality and/or link-quality measurements do not meet the acceptable performance levels. In some aspects, the base station uses the HARQ information to train the BS-side modulation DNN, such as by using a same set of encoded bits and adjusting ML parameters and/or an ML architecture until the HARQ information indicates an acceptable performance level. In response to training the BS-side modulation DNN, the base station 120 updates the BS-side modulation DNN as shown at 560 and processes subsequent downlink communications using the updated BS-side modulation DNN.

At 565, the UE 110 optionally (denoted with dashed lines) trains the UE-side demodulation DNN. To illustrate, the UE 110 uses CRC information from a decoding module to determine when to trigger a training procedure, such as by monitoring CRC information and triggering training when CRC indicates failures "N" times in a row, where "N" is a predetermined value. As one example, the UE 110 uses ADC samples of a modulated, baseband signal and CRC information generated by the decoding module as feedback to adjust various ML parameters (e.g., weights, biases) and/or ML architectures until the CRC information indicates an acceptable performance level. For instance, the UE 110, by way of a UE neural network manager (e.g., UE neural network manager 216) and/or a training module (e.g., UE training module 218), adjusts the ML parameters of the UE-side demodulation DNN with gradient values and uses CRC pass/fail information and/or by measuring a cost function of CRC error (e.g., minimize CRC error) to select adjustments that reduce bit errors and/or improve bit recovery. In some aspects, the UE neural network manager and/or a training module determine to train the UE-side demodulation DNN by using the cost function to determine when a performance of the UE-side demodulation DNN has degraded below a performance threshold value.

In response to training the UE-side demodulation DNN, the UE 110 optionally (denoted with dashed lines) updates the UE-side demodulation DNN as shown at 570 and processes subsequent downlink communications using the updated UE-side demodulation DNN. Alternatively or additionally, the UE 110 optionally extracts updates to the UE-side demodulation DNN as described with reference to FIG. 3 and transmits ML configuration updates (e.g., a UE-side ML configuration update) to the base station 120 at 575. Alternatively or additionally, the base station 120 optionally (denoted with dashed lines) transmits extracts updates to the BS-side modulation DNN as described with reference to FIG. 3 and transmits ML updates to the UE 110 at 580

A second example of signaling and data transactions for hybrid wireless communications processing chains that include DNNs and static algorithm modules is illustrated by the signaling and data transaction diagram 600 of FIG. 6. In the diagram 600, a base station (e.g., the base station 120) and a UE (e.g., the UE 110) exchange uplink wireless communications using processing chains that include a combination of static algorithm modules and DNNs in accordance with one or more aspects of hybrid wireless communications processing chains that include DNNs and static algorithm modules.

At 605, the base station 120 selects a UE-side modulation ML configuration for a UE-side DNN. To illustrate, and as similarly described at 505 of FIG. 5, the base station 120) selects a modulation ML configuration for a UE-side modulation DNN (e.g., the modulation DNN 434) that generates a digital, modulated baseband signal using encoded UL data as an input. The base station may select a default ML configuration that forms a modulation DNN suitable for multiple different types of UEs, channel conditions, and so forth. Alternatively or additionally, the base station 120 selects the UE-side modulation ML configuration from a predefined set of ML configurations (e.g., a set of ML configurations known to both the base station 120 and the UE 110) and/or based on information specific to the UE 110, such as UE location information, signal-quality measurements, link-quality measurements, UE capabilities, and so forth.

At 610, the base station 120 transmits an indication of the UE-side modulation ML configuration to the UE 110. As one example, the base station 120 transmits the indication of the UE-side modulation ML configuration in a field of DCI for PUSCH. In aspects, the base station 120 transmits, as the indication, an index value that maps to an entry in a codebook and/or points to a particular ML configuration out of a predefined set of ML configurations synchronized between the base station 120 and the UE 110. In some aspects, the base station 120 implicitly indicates the UE-side modulation ML configuration based on reciprocity as described with reference to FIG. 4.

At 615, the UE 110 selects a UE-side modulation ML configuration. To illustrate, and as similarly described at 515 of FIG. 5, the UE 110 may identify the indicated UE-side modulation ML configuration communicated by the base station at 610 and form a UE-side modulation DNN (e.g., the modulation DNNs 434) using the indicated ML configuration. Alternatively or additionally, the UE 110 analyzes performance metrics of one or more downlink reference signals (e.g., DMRS, PTRS, CSI-RS) to select the UE-side modulation ML configuration from a predefined set of ML configurations and/or a codebook. Accordingly, at 620, the UE 110 optionally (as denoted by a dashed line) indicates a UE-selected, UE-side modulation ML configuration to the base station 120.

At 625, the UE 110 forms a UE-side modulation DNN using either the indicated UE-side modulation ML configuration or a UE-selected, UE-side modulation ML configuration. Similarly, at 630, the base station 120 forms a BS-side demodulation DNN that performs complementary processing to the UE-side modulation DNN, where the BS-side demodulation ML configuration may be based on the UE-side modulation ML configuration indicated at 610 or the UE-selected, UE-side modulation ML configuration indicated at 620.

At 635, the UE 110 processes one or more uplink communications using an encoding module and the UE-side modulation DNN. To illustrate, and as described with reference to FIG. 5, the UE-side modulation DNN (e.g., the modulation DNNs 434) receives encoded bits from an encoding module that uses one or more static encoding algorithms (e.g., the encoding module 514). The UE-side modulation DNN processes the encoded bits and generates a digital, modulated baseband signal, where the processing may include performing MIMO operations. The UE-side modulation DNN inputs the digital modulated baseband signal into a TX RF processing module that generates an upconverted, analog modulated signal and, at 640, the UE 110 transmits the uplink communication(s) using the upconverted, analog modulated signal and one or more antenna of the UE (e.g., the antenna array 202).

At 645, the base station 120 processes the uplink communication(s) using a decoding module and the BS-side demodulation DNN. In aspects, the base station 120 includes the BS-side demodulation DNN in a receiver processing chain that includes a combination of DNNs and static algorithm modules, such as the BS uplink processing chain 524 of FIG. 5. To illustrate, an RX RF processing module in the receiver processing chain converts a received analog signal into a digital, modulated baseband signal. The BS-side demodulation DNN processes the digital, modulated baseband signal to recover encoded data and inputs the recovered encoded data into a static decoding module to generate recovered bits.

At 650, the base station 120 optionally (denoted with dashed lines) transmits feedback to the UE 110, denoted with dashed lines. As one example, the base station 120 transmits BER information, BLER information, and/or CRC information to the UE 110.

At 655, the UE 110 optionally (denoted with dashed lines) trains the UE-side modulation DNN. In aspects, the UE 110 triggers and/or initiates a training procedure for the UE-side modulation DNN based on the feedback transmitted at 650. For example, the UE 110 analyzes the BER and/or BLER and triggers the training when the BER and/or BLER exceeds an acceptable threshold value of error and/or exceeds the acceptable threshold value of error “M” times, where “M” corresponds to an arbitrary number. In some aspects, the UE 110 triggers and/or initiates the training procedure based on signal-quality measurements and/or link-quality measurements, such as signal-quality and/or link-quality measurements that indicate an interference level exceeds another threshold value. In response to training the UE-side modulation DNN, the UE 110 optionally updates the UE-side modulation DNN as shown at 660 and processes subsequent uplink communications using the updated UE-side modulation DNN. Alternatively or additionally, the UE 110 optionally extracts updates to the UE-side modulation DNN as described with reference to FIG. 3 and transmits ML configuration updates to the base station 120 at 665.

At 670, the base station 120 optionally trains the BS-side demodulation DNN. To illustrate, and as similarly described at 560 of FIG. 5, the base station 120 triggers a training of the BS-side demodulation DNN by monitoring CRC information and triggering training when CRC indicates failures “N” times in a row, where “N” is an arbitrary value. In aspects, the base station 120 trains the BS-side demodulation DNN using ADC samples of a modulated baseband signal and CRC information generated by the decoding module as feedback to adjust various ML parameters (e.g., weights, biases). In response to training the BS-side demodulation DNN, the base station 120 updates the BS-side demodulation DNN as shown at 675 and processes subsequent uplink communications using the updated BS-side demodulation DNN.

A third example of signaling and data transactions for hybrid wireless communications processing chains that include DNNs and static algorithm modules is illustrated by the signaling and data transaction diagram 700 of FIG. 7. In the diagram 700, a base station (e.g., the base station 120) uses federated learning techniques to manage DNN configurations of modulation and/or demodulation DNNs used in processing chains that include a combination of DNNs and static algorithm modules in accordance with one or more aspects of hybrid wireless communications processing chains that include DNNs and static algorithm modules. Aspects of the diagram 700 can be performed by a base station (e.g., the base station 120) and at least two UEs (e.g., at least two UEs 110).

Generally, federated learning corresponds to a distributed training mechanism for a machine-learning algorithm. To illustrate, an ML manager (e.g., the BS neural network manager 266) selects a baseline ML configuration and directs multiple devices to form and train an ML algorithm using the baseline ML configuration. The ML manager then receives and aggregates training results from the multiple devices to generate an updated ML configuration for the ML algorithm. As one example, the multiple devices each report learned parameters (e.g., weights or coefficients) generated by the ML algorithm while processing their own particular input data, and the ML manager creates an updated ML configuration by averaging the weights or coefficients to create an updated ML configuration. As another example, the multiple devices each report gradient results, based on their own individual input data, to the ML manager that indicate an optimal ML configuration based on function processing costs (e.g., processing time, processing accuracy), and the ML manager averages the gradients. In some aspects, the multiple devices report learned ML architecture updates and/or changes from the baseline ML configuration. The terms federated learning, distributed training, and/or distributed learning may be used interchangeably.

At 705, the base station 120 selects a group of UEs. As one example, the base station 120 selects a group of UEs based on common UE capabilities, such as a common number of antennas or common transceiver capabilities. Alternatively, or additionally, the base station 120 selects the group UEs based on commensurate signal or link quality measurements (e.g., parameters with values that are within a threshold value relative to one another). This can include commensurate uplink and/or downlink signal quality measurements, such as reference signal received power (RSRP) signal-to-interference-plus-noise ratio (SINR), channel quality indicator (CQI), and so forth. Based on any combination of common UE capabilities, commensurate signal or link quality measurements, estimated UE-location (e.g., within a predetermined distance between UEs), and so forth, the base station 120 selects two or more UEs to include in a group for federated learning.

At 710, the base station 120 selects an initial ML configuration for a DNN included in processing chains that utilize a combination of DNNs and static algorithm modules. To illustrate, the base station 120 selects an initial ML configuration for any combination of a BS-side modulation DNN, a UE-side demodulation DNN, a UE-side modulation DNN, and/or a BS-side demodulation DNN as described with reference to FIGS. 4-6. Thus, the base station 120 may select multiple initial ML configurations, where each initial ML configuration corresponds to a different DNN.

At 715, the base station 120 indicates the initial ML configuration to each of the UEs included in the group of UEs selected at 705. In other words, the base station 120 indicates a common ML configuration to each of the UEs as the initial ML configuration. This can include indicating the initial ML configuration using DCI, CSI-RS, pilot signals, and so forth, as described with reference to FIGS. 4-7. In some aspects, the base station 120 indicates, to each of the UEs, that the initial ML configuration corresponds to a baseline ML configuration for federated learning.

At 720, the base station 120 optionally (denoted with dashed lines) indicates one or more training conditions to each of the UEs included in the group of UEs selected at 705, where the training conditions correspond to triggering training of the corresponding DNNs. To illustrate, the base station requests the UE to report updated ML information (and/or to perform a training procedure) by indicating one or more update conditions that specify rules or instructions on when to report the updated ML information. As one example of an update condition, the base station 120 requests each UE in the group of UEs to transmit updated ML information (and/or to perform the training procedure) periodically and indicates a recurrence time interval. As another example update condition, the base station 120 requests each UE in the group of UEs to transmit the updated ML information (and/or to perform the training procedure) in response to detecting a trigger event, such as trigger events that correspond to changes in a DNN at a UE. To illustrate, the base station 120 requests each UE to transmit updated ML information when the UE determines that an ML parameter (e.g., a weight or coefficient) has changed more than a threshold value. As another example, the base station 120 requests that each UE transmits updated ML information in response to detecting when the ML architecture changes at the UE, such as when a UE identifies (by way of the UE neural network manager 216) that the DNN has changed the ML architecture by adding or removing a node or layer.

In some aspects, the base station 120 requests the UEs to report updated ML information based on UE-observed signal or link quality measurements. To illustrate, the base station 120 requests, as a trigger event and/or update condition, that the UE report updated ML information in response to identifying that a downlink signal and/or link quality parameter (e.g., RSSI, SINR, CQI, channel delay spread, Doppler spread) has changed by, or meets, a threshold value. As another example, the base station 120 requests, as a trigger event and/or update condition, that the UE report updated ML information in response to detecting a threshold value of acknowledgments/negative-acknowledgments (ACKs/NACKs). Thus, the base station 120 can request synchronized updates (e.g., periodic) from the group of UEs or asynchronous updates from the group of UEs based on conditions detected at the respective UE. In aspects, the base station requests the UE report observed signal or link quality measurements along with the updated ML information.

At 725, the base station 120 and the UEs 110 included in the group process communications using a respective processing chain that includes at least one DNN and at least one static algorithm module. To illustrate, and with reference to FIG. 4, the base station 120 processes downlink communications using a hybrid transmitter processing chain (e.g., the hybrid transmitter processing chain 424) that includes a BS-side modulation DNN (e.g., the DNN 434) and an encoding module (e.g., the encoding module 428) that uses static algorithms. Each UE in the group of UEs processes downlink communications using a respective hybrid receiver processing chain (e.g., respective instances of the hybrid receiver processing chain 426) that includes a respective UE-side demodulation DNN (e.g., the demodulation DNNs 442) and a respective decoding module (e.g., the decoding module 444) that uses a static algorithm, where each UE forms the respective UE-side demodulation DNN uses a common ML configuration indicated at 715. Alternatively or additionally, each UE in the group of UEs processes uplink communications using a hybrid transmitter processing chain (e.g., the hybrid transmitter processing chain 424) that includes a respective UE-side modulation DNN (e.g., the modulation DNNs 434) and a respective encoding module (e.g., the encoding module 428) that uses static algorithms. The base station 120 alternatively or additionally processes uplink communications using a hybrid receiver processing chain (e.g., the hybrid receiver processing chain 426) that includes a BS-side demodulation DNN (e.g., the demodulation DNN 442) and a decoding module (e.g., the decoding module 444) that uses static algorithms.

At 730, at least one UE 110 included in the group of UEs detects a training condition. To illustrate, the UE 110 detects, from a periodic training schedule, the occurrence/recurrence of a training time. Alternatively or additionally, the UE detects "N" CRC failures as described at 565 of FIG. 5, detects signal-quality measurements and/or link-quality measurements that do not meet a performance threshold, receives feedback from the base station 120, and so forth. Accordingly, and in response to detecting the training condition, the UE 110 trains the UE-side DNN at 735, such as that described at 565 of FIG. 5 and/or 655 of FIG. 6. At 740, each UE 110 transmits ML configuration updates to the base station 120 as described at 575 of FIG. 5 and/or at 665 of FIG. 6. For visual clarity, the diagram 700 illustrates each UE 110 in the group of UEs detecting a training condition. performing training of a UE-side DNN, and transmitting ML configuration updates to the base station 120 concurrently, but in other aspects, each UE detects a respective training condition and performs the training at different times (e.g., asynchronously) from one another.

At 745, the base station 120 identifies one or more updated ML configurations using received ML configuration updates from respective UEs in the group of UEs and federated learning techniques. For example, the base station 120 applies federated learning techniques that aggregate the updated ML configurations received from multiple UEs (e.g., updated ML configurations transmitted at 740) without potentially exposing private data used at the UE to generate the updated ML configurations. To illustrate, the base station 120 performs weighted averaging that aggregates ML parameters, gradients, and so forth. As another example, each UE 110 reports gradient results, based on their own individual input data, that indicate an optimal ML configuration based on function processing costs (e.g., processing time, processing accuracy), and the base station 120 averages the gradients. In some aspects, the multiple devices report learned ML architecture updates and/or changes from the initial and/or common ML configuration. The updated ML configurations can correspond to a UE-side demodulation DNN and/or a UE-side modulation DNN. In some aspects, the base station 120 additionally determines updates to a BS-side modulation DNN and/or a BS-side demodulation DNN as described with reference to FIGS. 4 and 5.

At 750, the base station 120 indicates the updated common ML configuration to at least some UEs included in the group of UEs. This can include indicating the updated common ML configurations(s) using DCI, using a CSI-RS, pilot signals, and so forth.

At 755, at least some UEs in the group of UEs update a respective UE-side DNN using an updated ML configuration indicated at 750. At 760, the process proceeds to signaling and data transactions as performed at 725, where each UE 110 then processes communications, uplink and/or downlink, using the updated UE-side DNN.

At 765, the base station 120 optionally updates one or more BS-side DNNs using updated ML configurations for BS-side DNNs, denoted in the diagram 700 through dashed lines. At 770, the base station 120 processes communications, uplink and/or downlink, using the updated BS-side DNN.

Example Methods

Example methods 800, 900, 1000, and 1100 are described with reference to FIGS. 8-11 in accordance with one or more aspects of hybrid wireless communications processing chains that include DNNs and static algorithm modules.

Figure 8:
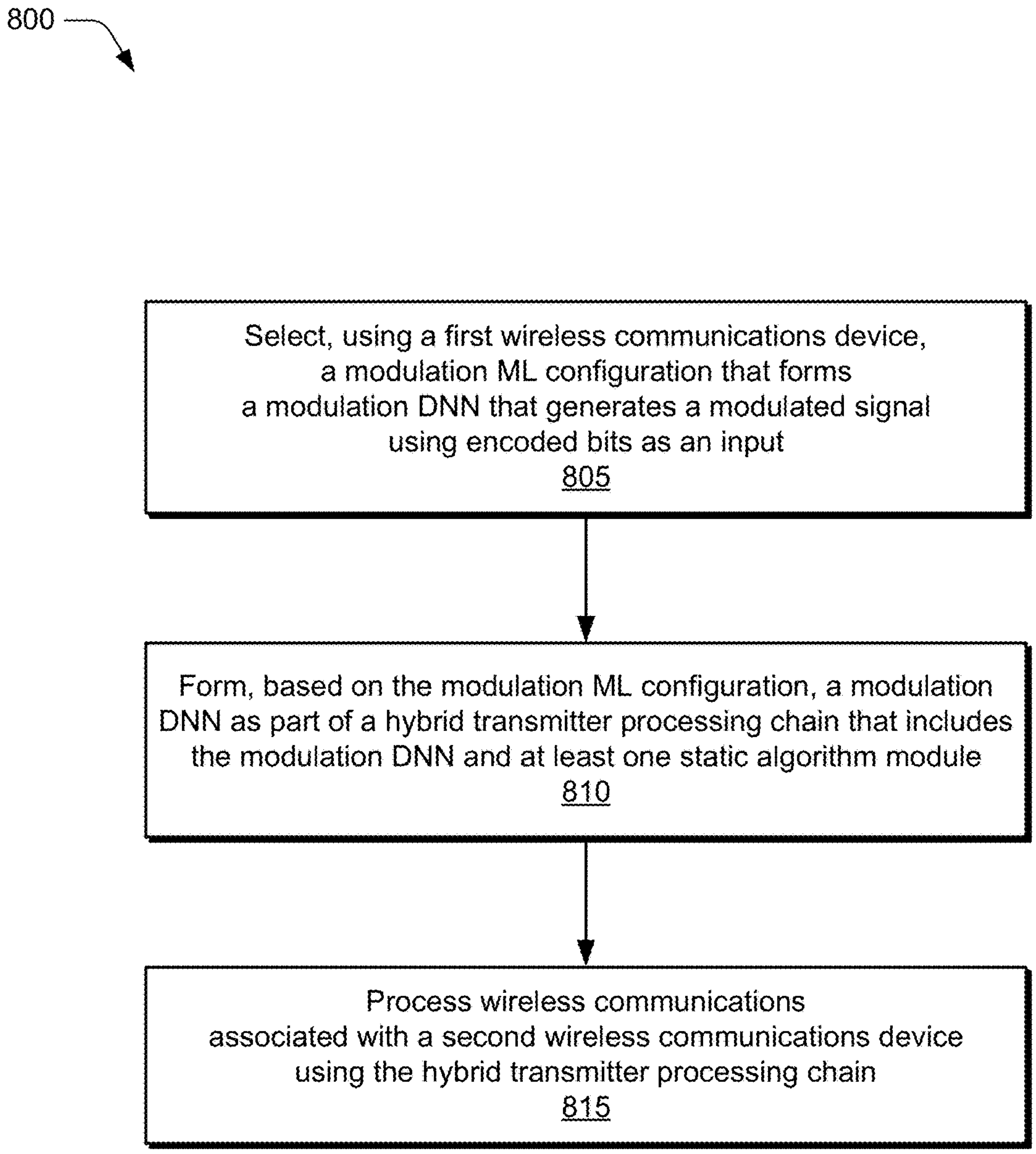
FIG. 8 illustrates a first example method for hybrid wireless communications processing chains that include DNNs and static algorithm modules.

FIG. 8 illustrates an example method 800 used to perform aspects of hybrid wireless communications processing chains that include DNNs and static algorithm modules. For example, in aspects of the method 800, a first wireless communication device communicates with a second wireless communication device using a hybrid transmitter processing chain. In some implementations, the first wireless communication device is a base station (e.g., the base station 120) and the second wireless communication device is a UE (e.g., the UE 110). In other implementations, the first wireless communication device is a UE (e.g., the UE 110) and the second wireless communication device is a base station (e.g., the base station 120).

At 805, a first wireless communication device selects a modulation machine-learning configuration, (ML configuration) that forms a modulation deep neural network (modulation DNN) that generates a modulated signal using encoded bits as an input. As one example, a base station (e.g., the base station 120) selects a BS-side modulation ML configuration as described at 505 of FIG. 5. As another example, a UE (e.g., the UE 110) selects a UE-side modulation ML configuration as described at 615 of FIG. 6.

At 810, the first wireless communication device forms, based on the modulation ML configuration, the modulation DNN as part of a hybrid transmitter processing chain that includes the modulation DNN and at least one static algorithm module. To illustrate, the base station (e.g., the base station 120) forms a BS-side modulation DNN (e.g., the modulation DNNs 434) as part of a hybrid transmitter processing chain (e.g., the hybrid transmitter processing chain 424) as described at 525 of FIG. 5 and with reference to FIG. 4. Alternatively, the UE (e.g., the UE 110) forms a UE-side modulation DNN (e.g., the modulation DNNS 434) as part of a hybrid transmitter processing chain (e.g., the hybrid transmitter processing chain 424) as described at 625 of FIG. 6 and with reference to FIG. 4.

At 815, the first wireless communication device processes wireless communications associated with a second wireless communication device using the hybrid transmitter processing chain. As one example, the base station (e.g., the base station 120) processes downlink communications directed to the UE (e.g., the UE 110) using the hybrid transmitter processing chain (e.g., the hybrid transmitter processing chain 424) as described at 535 of FIG. 5 and with reference to FIG. 4. As another example, the UE (e.g., the UE 110) processes uplink communications directed to the base station (e.g., the base station 120) using the hybrid transmitter processing chain (e.g., the hybrid transmitter processing chain 424) as described at 635 of FIG. 6 and with reference to FIG. 4.

Figure 9:
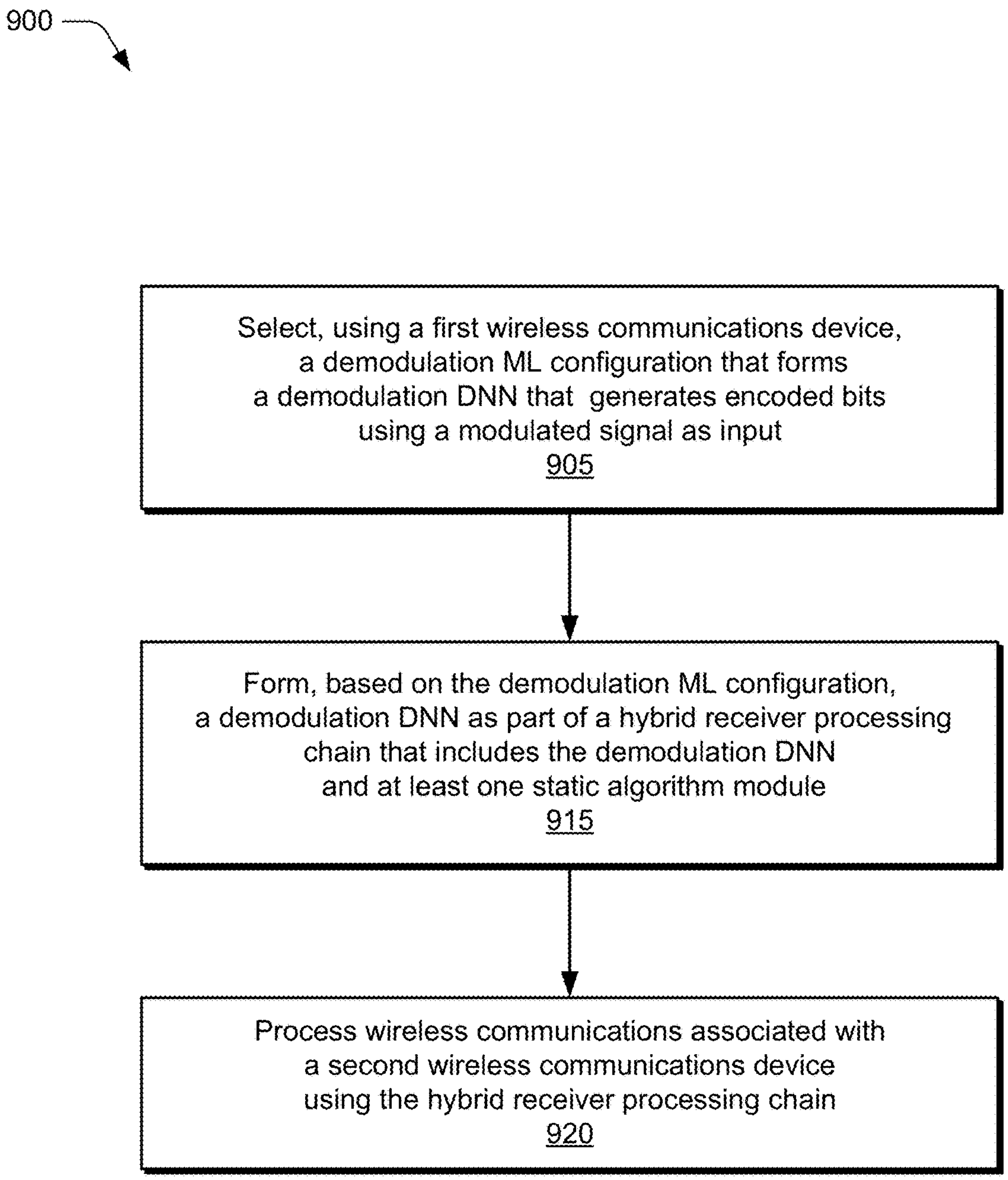
FIG. 9 illustrates a second example method for hybrid wireless communications processing chains that include DNNs and static algorithm modules.

FIG. 9 illustrates an example method 900 used to perform aspects of hybrid wireless communications processing chains that include DNNs and static algorithm modules. For example, in aspects of the method 900, a first wireless communication device communicates with a second wireless communication device using a hybrid receiver processing chain. In some implementations, the first wireless communication device is a base station (e.g., the base station 120) and the second wireless communication device is a UE (e.g., the UE 110). In other implementations, the first wireless communication device is a UE (e.g., the UE 110) and the second wireless communication device is a base station (e.g., the base station 120).

At 905, a first wireless communication device selects a demodulation machine-learning configuration, (ML configuration) that forms a demodulation deep neural network (demodulation DNN) that generates encoded bits using a modulated signal as an input. As one example, a base station (e.g., the base station 120) selects a BS-side demodulation ML configuration as described at 630 of FIG. 6. As another example, a UE (e.g., the UE 110) selects a UE-side demodulation ML configuration as described at 515 of FIG. 5.

At 910, the first wireless communication device forms, based on the demodulation ML configuration, the demodulation DNN as part of a hybrid receiver processing chain that includes the demodulation DNN and at least one static algorithm module. To illustrate, the base station (e.g., the base station 120) forms a BS-side demodulation DNN (e.g., the demodulation DNNs 442) as part of a hybrid transmitter processing chain (e.g., the hybrid receiver processing chain 426) as described at 630 of FIG. 6 and with reference to FIG. 4. Alternatively, the UE (e.g., the UE 110) forms a UE-side demodulation DNN (e.g., the demodulation DNNs 442) as part of a hybrid receiver processing chain (e.g., the hybrid receiver processing chain 426) as described at 530 of FIG. 5 and with reference to FIG. 4.

At 915, the first wireless communication device processes wireless communications associated with a second wireless communication device using the hybrid receiver processing chain. As one example, the base station (e.g., the base station 120) processes uplink communications from the UE (e.g., the UE 110) using the hybrid receiver processing chain (e.g., the hybrid receiver processing chain 426) as described at 645 of FIG. 6 and with reference to FIG. 4. As another example. the UE (e.g., the UE 110) processes downlink communications from the base station (e.g., the base station 120) using the hybrid receiver processing chain (e.g., the hybrid receiver processing chain 426) as described at 545 of FIG. 5 and with reference to FIG. 4.

Figure 10:
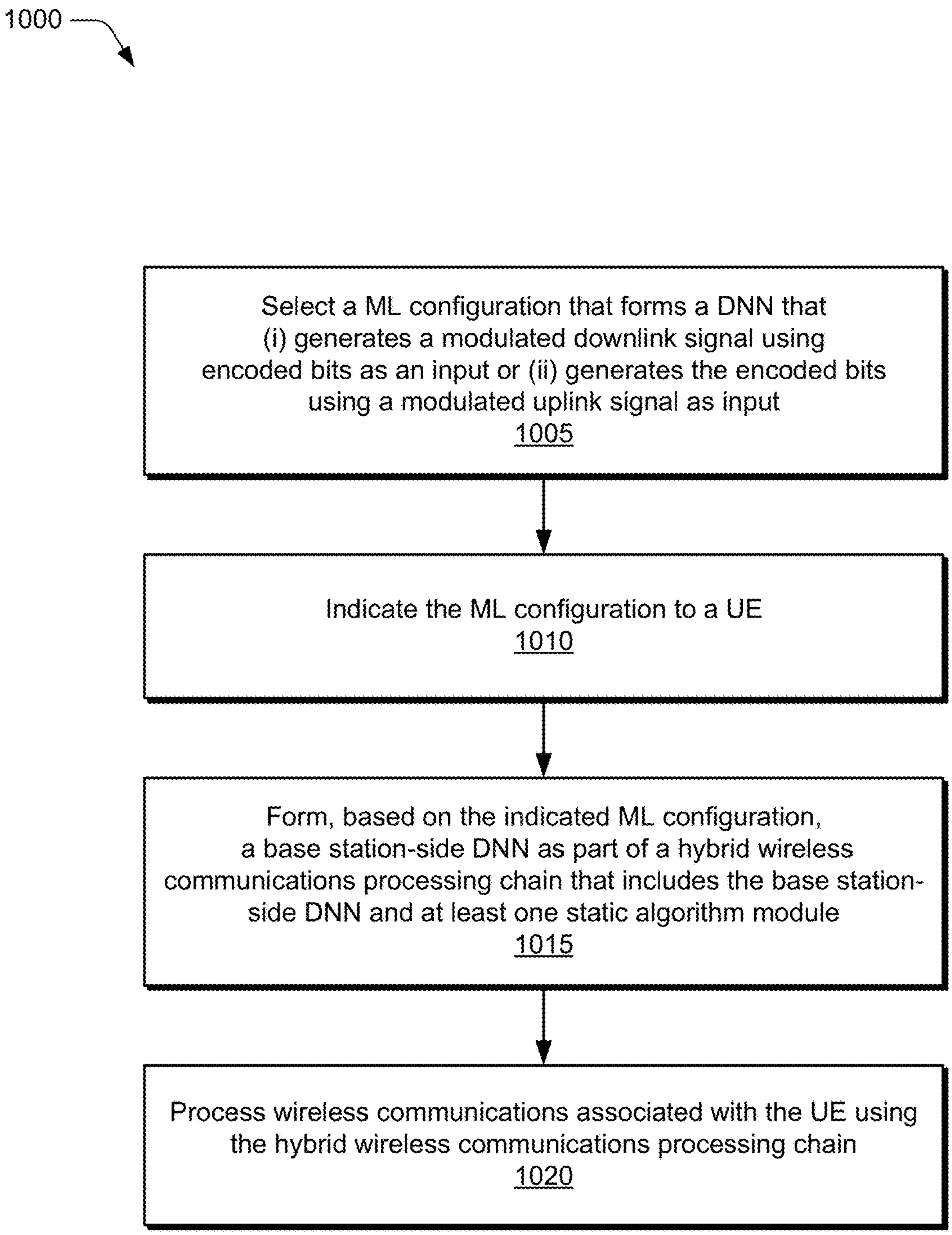
FIG. 10 illustrates a third example method for hybrid wireless communications processing chains that include DNNs and static algorithm modules.

FIG. 10 illustrates an example method 1000 used to perform aspects of hybrid wireless communications processing chains that include DNNs and static algorithm modules. In some implementations, operations of the method 1000 are performed by a base station, such as the base station 120.

At 1005, a base station selects a machine-learning configuration, ML configuration, that forms a DNN that (i) generates a modulated downlink signal using encoded bits as an input or (ii) generates the encoded bits using a modulated uplink signal as the input. For instance, the base station (e.g., the base station 120) selects a BS-side modulation ML configuration for a BS-side modulation DNN (e.g., the modulation DNNs 434) that processes downlink communications as described at 505 of FIG. 5. As another example, the base station (e.g., the base station 120) selects a UE-side demodulation configuration for a UE-side demodulation DNN (e.g., the demodulation DNNs 442). In some aspects, the base station selects, as the ML configuration a UE-side modulation ML configuration for a UE as described at 605 of FIG. 6 and with reference to FIG. 4.

At 1010, the base station indicates, to a UE, the ML configuration. To illustrate, the base station (e.g., the base station 120) indicates a BS-side modulation ML configuration and/or a UE-side demodulation ML configuration to the UE (e.g., the UE 110) in a DCI field or using a reference signal as described at 510 of FIG. 5 and as described with reference to FIG. 4. In some aspects, the base station (e.g., the base station 120) indicates a UE-side modulation ML configuration as described at 610 of FIG. 6 and with reference to FIG. 5.

At 1015, the base station forms, based on the indicated ML configuration, a base station-side DNN included in a hybrid wireless communications processing chain that includes the base station-side DNN and at least one static algorithm module. To illustrate, when the base station selects and/or indicates a BS-side modulation ML configuration at 1005 and 1010, the base station (e.g., the base station 120) forms a BS-side modulation DNN (e.g., modulation DNN 432) included in a hybrid transmitter processing chain (e.g. the hybrid transmitter processing chain 424) as described at 525 of FIG. 5 and with reference to FIG. 4. Alternatively or additionally, when the base station selects and/or indicates a UE-side demodulation ML configuration at 1005 and 1010, the base station (e.g., the base station 120) forms BS-side modulation DNN with a complementary BS-side ML configuration. In some aspects, such as when the base station selects and indicates a UE-side modulation ML configuration (e.g., as described at 605 and 610 of FIG. 6), the base station (e.g., the base station 120) forms a BS-side demodulation DNN (e.g., the demodulation DNN 442) included in a hybrid receiver processing chain (e.g., the hybrid receiver processing chain 426) as described with reference to FIG. 4.

At 1020, the base station processes wireless communications associated with the UE using the hybrid wireless communications processing chain. To illustrate, the base station (e.g., the base station 120) processes downlink communications directed to the UE (e.g., the UE 110) using a BS-side modulation DNN (e.g., the modulation DNN 434) included in a hybrid transmitter processing chain (e.g., the hybrid transmitter processing chain 424) as described at 535 of FIG. 5. Alternatively or additionally, the base station (e.g., the base station 120) processes uplink communications received from the UE (e.g., the UE 110) using a BS-side demodulation DNN (e.g., the demodulation DNNs 442) included in a receiver processing chain (e.g., the hybrid receiver processing chain 426) as described at 645 of FIG. 6.

Figure 11:
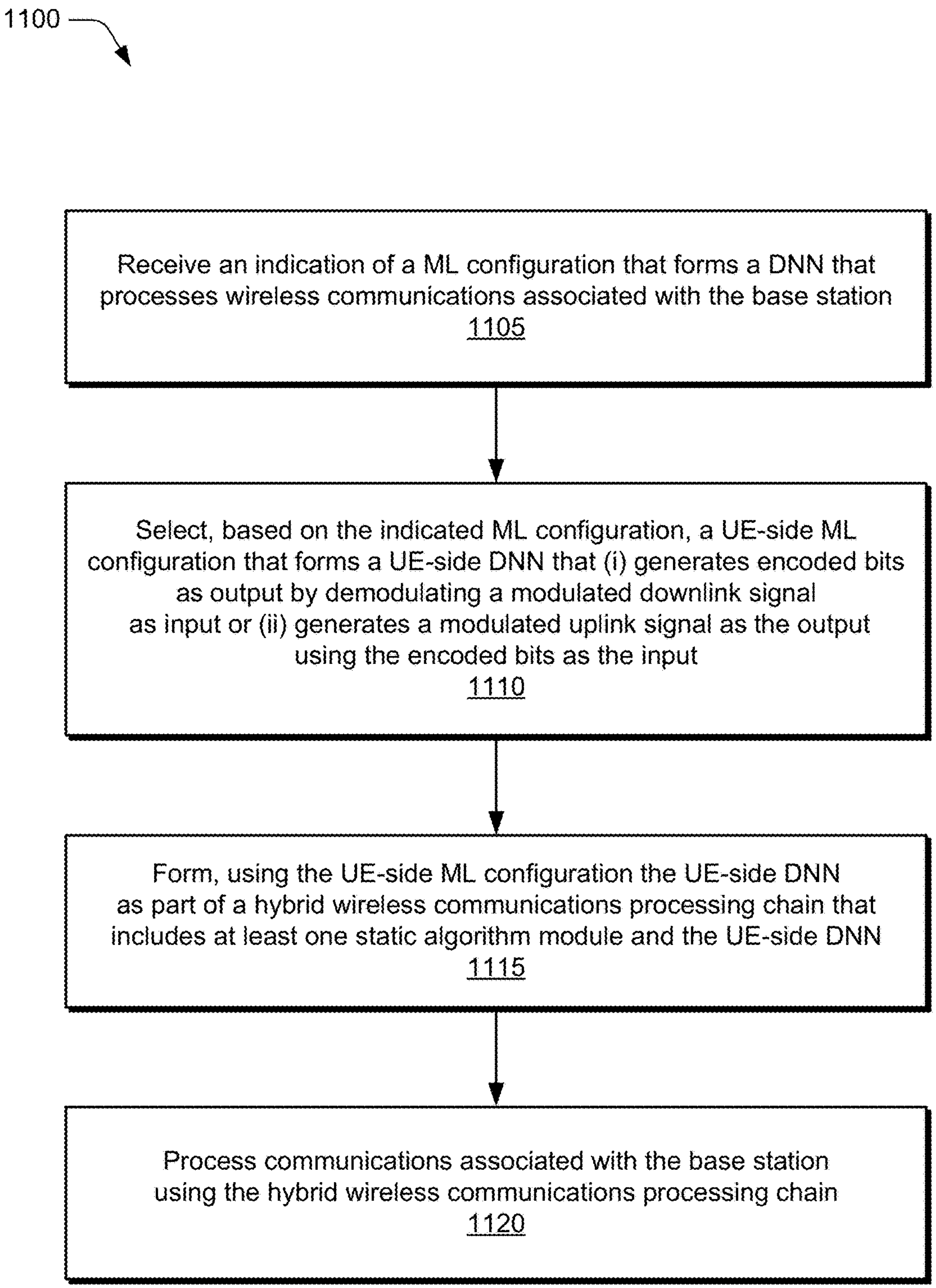
FIG. 11 illustrates a fourth example method for hybrid wireless communications processing chains that include DNNs and static algorithm modules.

FIG. 11 illustrates an example method 1100 used to perform aspects of hybrid wireless communications processing chains that include DNNs and static algorithm modules. In some implementations, operations of the method 1100 are performed by a user equipment, such as UE 110.

At 1105, a UE receives, from a base station, an indication of a ML configuration that forms a DNN that processes wireless communications associated with the base station. As one example, the UE (e.g., the UE 110) receives an indication of a BS-side modulation ML configuration as described at 510 of FIG. 5. As another example, the UE (e.g., the UE 110) receives an indication of a UE-side ML configuration, such as by receiving an indication of a UE-side modulation ML configuration as described at 610 of FIG. 6 and/or by receiving an indication of a UE-side demodulation ML configuration as described at 510 of FIG. 5.

At 1110, the UE selects, based on the indicated ML configuration, a UE-side ML configuration that forms a UE-side DNN that (i) generates encoded bits as output using a modulated downlink signal as input or (ii) generates a modulated uplink signal using the encoded bits as the input. To illustrate, the UE (e.g., the UE 110) selects a UE-side demodulation ML configuration as described at 515 of FIG. 5 and/or selects a UE-side modulation ML configuration as described at 615 of FIG. 6.

At 1115, the UE forms, using the UE-side ML configuration, the UE-side DNN as part of a hybrid wireless communications processing chain that includes at least one static algorithm module and the UE-side DNN. This can include the UE (e.g., the UE 110) forming a UE-side demodulation DNN included in a hybrid receiver processing chain (e.g., the hybrid receiver processing chain 426) as described at 530 of FIG. 5 and with reference to FIG. 4, or the UE (e.g., the UE 110) forming a UE-side modulation DNN included in a hybrid transmitter processing chain (e.g., the hybrid transmitter processing chain 424) as described at 625 of FIG. 6 and with reference to FIG. 4.

At 1120, the UE processes wireless communications associated with the base station using the hybrid wireless communications processing chain. To illustrate, the UE (e.g., the UE 110) processes downlink communications from the base station (e.g., the base station 120) using a UE-side demodulation DNN (e.g., the demodulation DNNs 442) included in a receiver processing chain (e.g., the hybrid receiver processing chain 426) as described at 545 of FIG. 5. Alternatively or additionally, the user equipment (e.g., the UE 110) processes uplink communications directed to the base station (e.g., the base station 120) using a UE-side modulation DNN (e.g., the modulation DNNs 434) included in a transmitter processing chain (e.g., the hybrid transmitter processing chain 424) as described at 635 of FIG. 6.

The order in which the method blocks of the methods 800-1100 are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-Specific Integrated Circuits (ASICs), Application-specific Standard Products (ASSPs), System-on-a-chip systems (SoCs), Complex Programmable Logic Devices (CPLDs), and the like.

Although techniques and devices for hybrid wireless communications processing chains that include DNNs and static algorithm modules have been described in language specific to features and/or methods, it is to be understood that the subject of the appended claims is not necessarily limited to the specific features or methods described. Rather, the specific features and methods are disclosed as example implementations of hybrid wireless communications processing chains that include DNNs and static algorithm modules.

EXAMPLES

In the following, some examples of the subject matter described herein are described.

In one example, a method is implemented by a first wireless communication device for communicating, using a hybrid wireless communications processing chain, with a second wireless communication device. The method comprises selecting, using the first wireless communication device, a modulation machine-learning, ML, configuration for forming a modulation deep neural network, DNN, that generates a modulated signal using encoded bits, received from an encoding module, as an input; forming, based on the modulation ML configuration, the modulation DNN as part of a hybrid transmitter processing chain that includes the modulation DNN and at least one static algorithm module; and transmitting wireless communications associated with the second wireless communication device using the hybrid transmitter processing chain.

Processing wireless communications associated with the second wireless communication device using the hybrid transmitter processing chain may optionally comprise transmitting the modulated signal to the second wireless communication device.

Selecting the modulation ML configuration optionally further comprises selecting a modulation ML configuration that forms a DNN that performs multiple-input, multiple-output (MIMO) antenna processing. The at least one static algorithm module may optionally be an encoding module. The method may optionally further comprise generating the encoded bits using the encoding module. Generating the encoded bits may optionally further comprise using, by the encoding module, one or more of: a low-density parity-check (LPDC) encoding algorithm; a polar encoding algorithm; a turbo encoding algorithm; or a Viterbi encoding algorithm.

Selecting the modulation ML configuration may optionally comprise selecting: a convolutional neural network architecture; a recurrent neural network architecture; a fully connected neural network architecture; or a partially connected neural network architecture.

The method may optionally further comprise indicating the modulation ML configuration to the second wireless communication device.

The first wireless communication device may be a base station. The second wireless communication device may be a user equipment (UE). Selecting the modulation ML configuration may optionally further comprise selecting a base station-side (BS-side) modulation ML configuration for forming, as the modulation DNN, a BS-side modulation DNN that generates a modulated downlink signal using the encoded bits, received from the encoding module, as the input. Forming the modulation DNN may optionally further comprise forming the BS-side modulation DNN. The method may optionally further comprise indicating the BS-side modulation ML configuration to the UE. Indicating the BS-side modulation ML configuration to the UE may optionally further comprise indicating the BS-side modulation ML configuration using a field in downlink control information (DCI), or transmitting a reference signal mapped to the BS-side modulation ML configuration.

The method may optionally further comprise receiving hybrid automatic repeat request (HARQ) feedback from the UE and training the BS-side modulation DNN using the HARQ feedback. The method may optionally further comprise electing a user equipment-side (UE-side) modulation ML configuration that forms a UE-side modulation DNN for generating a modulated uplink signal and indicating the UE-side modulation ML configuration to the UE. A demodulation BS-side DNN may optionally be formed based on the UE-side modulation ML configuration. Indicating the UE-side modulation ML configuration to the UE may optionally further comprise indicating the UE-side modulation ML configuration to the UE using downlink control information (DCI). The BS-side modulation ML configuration may optionally be a first BS-side ML configuration. The method may optionally further comprise receiving, from the UE, an indication of a user equipment-selected (UE-selected) UE-side demodulation ML configuration. The BS-side modulation DNN may optionally be updated using a second BS-side modulation ML configuration that is complementary to the UE-selected, UE-side demodulation ML configuration. Receiving the indication of the UE-selected, UE-side demodulation ML configuration may optionally further comprise receiving the indication of the UE-selected, UE-side demodulation ML configuration in channel state information (CSI). The UE may optionally be a first UE. First UE-side ML configuration updates to a common ML configuration may optionally be received from the first UE. The common ML configuration may optionally be a demodulation ML configuration or a modulation ML configuration. Second UE-side ML configuration updates to the common ML configuration may optionally be received from a second UE. An updated common ML configuration may optionally be selected using federated learning techniques, the first UE-side ML configuration updates, and the second UE-side ML configuration updates. The first UE and the second UE may optionally be directed to update a respective UE-side DNN using the updated common ML configuration.

The first wireless communication device may optionally be a user equipment (UE). The second wireless communication device may optionally be a base station. Selecting the modulation ML configuration may further comprise selecting a UE-side modulation ML configuration that forms a UE-side modulation DNN that generates a modulated uplink signal using the encoded bits as the input. The at least one static algorithm module may optionally be an encoding module. Transmitting the wireless communications may further comprise receiving, as input, the encoded bits from the encoding module and generating, using the UE-side modulation DNN in the hybrid transmitter processing chain and based on the encoded bits, the modulated uplink signal. Selecting the modulation ML configuration may optionally further comprise receiving, from the base station, an indication of the UE-side modulation ML configuration and selecting the modulation ML configuration using the indication. Receiving the indication may optionally further comprise receiving the indication in a field of downlink control information (DCI) for a physical uplink shared channel (PUSCH). Selecting the UE-side modulation ML configuration may optionally further comprise selecting the UE-side modulation ML configuration from a predefined set of modulation ML configurations.

In another example, a method is implemented by a first wireless communication device for communicating, using a hybrid receiver processing chain, with a second wireless communication device. The method comprises selecting a demodulation machine-learning, ML, configuration that forms a demodulation deep neural network, DNN, that generates encoded bits as output using a modulated signal as input; forming, using the demodulation ML configuration, the demodulation DNN as part of the hybrid receiver processing chain that includes at least one static algorithm module and the demodulation DNN; and receiving wireless signals from the second wireless communication device using the hybrid receiver processing chain.

The at least one static algorithm module may optionally comprise a decoding module. The method may optionally further comprise generating, using the decoding module, decoded bits. Generating the decoded bits may optionally further comprise using, by the decoding module, one or more of: a low-density parity-check, LPDC, decoding algorithm; a polar decoding algorithm; a turbo decoding algorithm; or a Viterbi decoding algorithm. Selecting the demodulation ML configuration may optionally further comprise selecting an ML configuration that forms the demodulation DNN to receive a modulated signal as a first input and decoding feedback from the decoding module as a second input. The method may optionally further comprise forming the demodulation DNN to receive, as the second input to the demodulation DNN, one or more log-likelihood ratios from the decoding module. The method may optionally further comprise measuring a cost function of the demodulation DNN using at least one of: a block error rate; or a bit error rate. It may optionally be determined, using the cost function that a performance of the demodulation DNN has degraded below a threshold value. Based on determining the performance as degraded below the threshold value, a training procedure for the demodulation DNN may optionally be initiated. The method may optionally further comprise determining to initiate the training procedure for the demodulation DNN based on: analyzing one or more signal-quality measurements or link-quality measurements; or analyzing a cyclic redundancy check, CRC, for recovered bits that are generated, in combination, by the demodulation DNN and the decoding module. The method may optionally further comprise identifying the CRC for the recovered bits fails a predetermined number of times in a row; and based on the CRC failing the predetermined number of times, training the demodulation DNN.

The first wireless communication device may optionally be a user equipment (UE). The second wireless communication device may optionally be a base station. Selecting the demodulation ML configuration may optionally further comprise selecting a user equipment-side (UE-side) demodulation ML configuration that forms, as the demodulation DNN, a UE-side demodulation DNN. Selecting the demodulation ML configuration may optionally further comprise receiving, from the base station, an indication of a base station-side modulation ML configuration; and selecting a user equipment-side, UE-side, demodulation ML configuration using the base station-side modulation ML configuration. Receiving the indication from the base station may optionally further comprise receiving the indication in downlink control information, DCI; or receiving the indication as a reference signal mapped to the base station-side modulation ML configuration. Selecting the UE-side demodulation ML configuration may optionally further comprise selecting a first demodulation ML configuration based on the base station-side modulation ML configuration indicated by the base station; determining that a demodulation DNN formed using the first demodulation ML configuration fails to meet a performance threshold; and selecting a second demodulation ML configuration that meets the performance threshold. The second demodulation ML configuration may optionally be indicated to the base station. Indicating the second demodulation ML configuration to the base station may optionally further comprise transmitting a sounding reference signal (SRS) mapped to the second demodulation ML configuration.

The first wireless communication device may optionally be a base station. The second wireless communication device may optionally be a user equipment (UE). Selecting the demodulation ML configuration may optionally further comprise selecting a base station-side (BS-side) demodulation ML configuration that forms a BS-side demodulation deep neural network (DNN) that generates the decoded bits using a modulated uplink signal as an input. Selecting the BS-side demodulation ML configuration may optionally further comprise selecting the BS-side demodulation ML configuration as a complementary ML configuration to a UE-side modulation ML configuration indicated to the UE.

In another example, an apparatus comprises a wireless transceiver; a processor; and computer-readable storage media comprising instructions that, responsive to execution by the processor, direct the apparatus to perform any of the methods described herein.

In another example, a computer-readable storage media comprises instructions that, responsive to execution by a processor, direct an apparatus to perform any of the methods described herein.

What is claimed is:

1. A method implemented by a base station for communicating, using a hybrid wireless communications processing chain, with a first user equipment (UE), the method comprising:

selecting, using the base station, a base station-side (BS-side) modulation machine-learning (ML) configuration for forming a BS-side modulation deep neural network (DNN) that generates a modulated signal using encoded bits, received from an encoding module, as an input;

forming, based on the BS-side modulation ML configuration, the BS-side modulation DNN as part of a hybrid transmitter processing chain that includes the BS-side modulation DNN and at least one static algorithm module;

transmitting wireless communications associated with the first UE using the hybrid transmitter processing chain;

receiving first UE-side ML configuration updates to a common ML configuration from the first UE, the common ML configuration being a demodulation ML configuration or a modulation ML configuration;

receiving second UE-side ML configuration updates to the common ML configuration from a second UE;

selecting an updated common ML configuration using federated learning techniques, the first UE-side ML configuration updates, and the second UE-side ML configuration updates; and directing the first UE and the second UE to update a respective UE-side DNN using the updated common ML configuration.

2. The method as recited in claim 1, wherein selecting the BS-side modulation ML configuration further comprises:

selecting a modulation ML configuration that forms a DNN that performs multiple-input, multiple-output (MIMO) antenna processing.

3. The method as recited in claim 1, wherein the at least one static algorithm module is the encoding module, and the method further comprises:

generating the encoded bits using the encoding module.

4. The method as recited in claim 3, wherein generating the encoded bits further comprises:
using, by the encoding module, one or more of:
a low-density parity-check (LPDC) encoding algorithm;
a polar encoding algorithm;
a turbo encoding algorithm; or
a Viterbi encoding algorithm.

5. The method as recited in claim 1, wherein selecting the BS-side modulation ML configuration comprises selecting:
a convolutional neural network architecture;
a recurrent neural network architecture;
a fully connected neural network architecture; or
a partially connected neural network architecture.

6. The method as recited in claim 1, further comprising:
indicating the updated common ML configuration to the first UE or the second UE.

7. The method as recited in claim 1, further comprising:
indicating the BS-side modulation ML configuration to the first UE or the second UE.

8. The method as recited in claim 7, wherein indicating the BS-side modulation ML configuration to the UE further comprises:
indicating the BS-side modulation ML configuration using a field in downlink control information (DCI); or
transmitting a reference signal mapped to the BS-side modulation ML configuration.

9. The method as recited in claim 1, further comprising:
receiving hybrid automatic repeat request (HARQ) feedback from the UE; and
training the BS-side modulation DNN using the HARQ feedback.

10. The method as recited in claim 1, further comprising:
selecting a user equipment-side (UE-side) modulation ML configuration that forms a UE-side modulation DNN for generating a modulated uplink signal; and
indicating the UE-side modulation ML configuration to the UE.

11. The method as recited in claim 10, wherein indicating the UE-side modulation ML configuration to the UE further comprises:
indicating the UE-side modulation ML configuration to the UE using downlink control information (DCI).

12. The method as recited in claim 1, wherein the BS-side modulation ML configuration is a first BS-side ML configuration, the method further comprising:
receiving, from the UE, an indication of a user equipment-selected (UE-selected) UE-side demodulation ML configuration; and
updating the BS-side modulation DNN using a second BS-side modulation ML configuration that is complementary to the UE-selected, UE-side demodulation ML configuration.

13. The method as recited in claim 12, wherein receiving the indication of the UE-selected, UE-side demodulation ML configuration further comprises:
receiving the indication of the UE-selected, UE-side demodulation ML configuration in channel state information (CSI).

14. The method as recited in claim 10, wherein selecting the UE-side modulation ML configuration further comprises:
selecting the UE-side modulation ML configuration from a predefined set of modulation ML configurations.

15. A base station comprising:
a wireless transceiver;
a processor; and
computer-readable storage media comprising instructions that, responsive to execution by the processor, direct the base station to:
select, using the base station, a base station-side (BS-side) modulation machine-learning (ML) configuration for forming a BS-side modulation deep neural network (DNN) that generates a modulated signal using encoded bits, received from an encoding module, as an input;
form, based on the BS-side modulation ML configuration, the BS-side modulation DNN as part of a hybrid transmitter processing chain that includes the BS-side modulation DNN and at least one static algorithm module;
transmit wireless communications associated with a first user equipment (UE) using the hybrid transmitter processing chain;
receive first UE-side ML configuration updates to a common ML configuration from the first UE, the common ML configuration being a demodulation ML configuration or a modulation ML configuration;
receive second UE-side ML configuration updates to the common ML configuration from a second UE;
select an updated common ML configuration using federated learning techniques, the first UE-side ML configuration updates, and the second UE-side ML configuration updates; and
direct the first UE and the second UE to update a respective UE-side DNN using the updated common ML configuration.

16. The base station as recited in claim 15, wherein to select the BS- side modulation ML configuration, the base station:
selects a modulation ML configuration that forms a DNN that performs multiple- input, multiple-output (MIMO) antenna processing.

17. The base station as recited in claim 15, wherein the at least one static algorithm module is the encoding module, and the base station:
generates the encoded bits using the encoding module.

18. The base station as recited in claim 15, wherein to generate the encoded bits, the base station:
implements, by the encoding module, one or more of:
a low-density parity-check (LPDC) encoding algorithm;
a polar encoding algorithm;
a turbo encoding algorithm; or
a Viterbi encoding algorithm.

19. The base station as recited in claim 15, wherein to select the BS- side modulation ML configuration, the base station selects:
a convolutional neural network architecture;
a recurrent neural network architecture;
a fully connected neural network architecture; or
a partially connected neural network architecture.

20. The base station as recited in claim 15, wherein the base station:
indicates the updated common modulation ML configuration to the first UE or the second UE.

* * * * *